US010926174B2

(12) United States Patent
Matsushita et al.

(10) Patent No.: US 10,926,174 B2
(45) Date of Patent: Feb. 23, 2021

(54) INFORMATION PROCESSING SYSTEM, INFORMATION PROCESSING METHOD, INFORMATION PROCESSING APPARATUS, AND NON-TRANSITORY STORAGE MEDIUM STORING INFORMATION PROCESSING PROGRAM FOR CONTROLLING PROGRESSION OF A GAME WITH AT LEAST ONE VIRTUAL AREA

(71) Applicant: NINTENDO CO., LTD., Kyoto (JP)

(72) Inventors: Shingo Matsushita, Kyoto (JP); Tetsuo Hatanaka, Kyoto (JP); Yuji Ohashi, Kyoto (JP); Kouhei Maeda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/372,968

(22) Filed: Apr. 2, 2019

(65) Prior Publication Data

US 2019/0308100 A1 Oct. 10, 2019

(30) Foreign Application Priority Data

Apr. 9, 2018 (JP) ............................. JP2018-074496

(51) Int. Cl.
*A63F 13/55* (2014.01)
*A63F 13/45* (2014.01)
*A63F 13/79* (2014.01)
*A63F 13/355* (2014.01)

(52) U.S. Cl.
CPC ............ *A63F 13/45* (2014.09); *A63F 13/355* (2014.09); *A63F 13/55* (2014.09); *A63F 13/79* (2014.09)

(58) Field of Classification Search
None
See application file for complete search history.

(56) References Cited

U.S. PATENT DOCUMENTS

| 9,545,565 | B1* | 1/2017 | Kornmann | A63F 13/65 |
|---|---|---|---|---|
| 2009/0017913 | A1* | 1/2009 | Bell | A63F 13/35 |
| | | | | 463/40 |
| 2012/0231889 | A1* | 9/2012 | Lee | A63F 13/12 |
| | | | | 463/42 |
| 2012/0315992 | A1* | 12/2012 | Gerson | G06F 16/29 |
| | | | | 463/42 |
| 2013/0005417 | A1* | 1/2013 | Schmidt | A63F 13/213 |
| | | | | 463/5 |

(Continued)

FOREIGN PATENT DOCUMENTS

JP 2017-046918 A 3/2017

*Primary Examiner* — Lawrence S Galka
(74) *Attorney, Agent, or Firm* — Scully, Scott, Murphy & Presser, P.C.

(57) ABSTRACT

An example system including a plurality of terminals configured to be operated by respective users each belonging to one of a plurality of groups executes a game process involved in a game related to a virtual area in the plurality of terminals, respectively, updates area information about the virtual area for each group, based on the game process executed in the plurality of terminals, determines, for each of a plurality of periods of time, which group acquires the virtual area based on the updated area information for each group, and outputs a result of the game in which the plurality of groups compete against each other to acquire the virtual area after repeatedly performing the determining.

25 Claims, 20 Drawing Sheets

(56) References Cited

U.S. PATENT DOCUMENTS

| | | | |
|---|---|---|---|
| 2013/0072308 A1* | 3/2013 | Peck | A63F 13/332 463/42 |
| 2014/0094317 A1* | 4/2014 | Takagi | A63F 13/35 463/42 |
| 2014/0155156 A1* | 6/2014 | Peck | A63F 13/79 463/31 |
| 2015/0126269 A1* | 5/2015 | Linden | A63F 13/88 463/23 |
| 2015/0231499 A1* | 8/2015 | Mizukami | A63F 13/822 463/31 |
| 2018/0280798 A1* | 10/2018 | Ozawa | A63F 13/48 |

* cited by examiner

FIG. 6

| GROUP | USER IDENTIFICATION INFORMATION |
|---|---|
| A | USER a1 |
| | USER a2 |
| | USER a3 |
| | ⋮ |
| B | USER b1 |
| | USER b2 |
| | USER b3 |
| | ⋮ |
| C | USER c1 |
| | USER c2 |
| | USER c3 |
| | ⋮ |

FIG. 7
SCORES AFTER END OF ROUND
| VIRTUAL AREA | AREA SCORES | |
|---|---|---|
| E8 | B | 100,000 |
| | A | 95,000 |
| | C | 70,000 |
OR
SCORES DURING ROUND
| VIRTUAL AREA | AREA SCORES | |
|---|---|---|
| E8 | B | 195,000 |
| | A | 95,000 |
| | C | 70,000 |
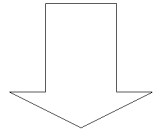
GROUP B HAS SEIZED AREA E8
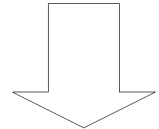
GROUP B HAS SEIZED AREA E8
(KNOCKOUT)

FIG. 13

| SPECIFIC EFFECT | DETAILS |
|---|---|
| EFFECT 1 | OFFENSIVE POWER OF CHARACTER OF TYPE 1 IS ENHANCED |
| EFFECT 2 | AGILITY OF CHARACTER OF TYPE 2 IS IMPROVED |
| EFFECT 3 | FREQUENCY OF FINISHING MOVE OF CHARACTER OF TYPE 3 IS INCREASED |

F I G. 1 4

ADDITION PROPORTIONS TO ADJACENT AREAS

| CLASS | TOTAL OBTAINED SCORE VALUE | ADDITION PROPORTION TO OWN GROUP IN ADJACENT AREA |
|---|---|---|
| 1 | 0~100 | 0% |
| 2 | 101~300 | 10% |
| 3 | 301~500 | 20% |
| 4 | 501~1000 | 30% |
| 5 | 1001~2000 | 40% |
| ⋮ | ⋮ | ⋮ |

F I G. 1 5
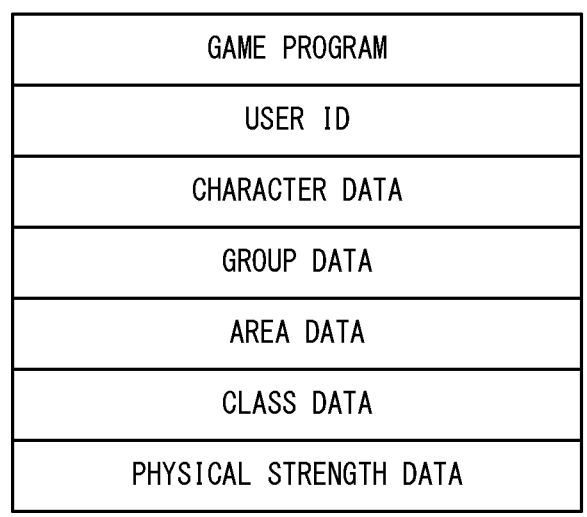
F I G. 1 6
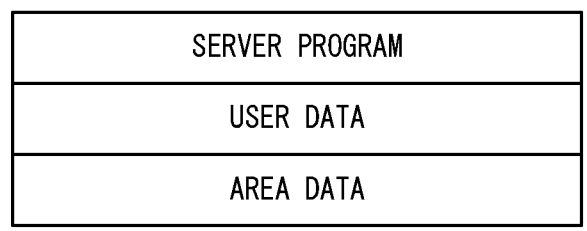

FIG. 17

USER DATA

| USER ID | USER CHARACTERS | PHYSICAL STRENGTH VALUE | CLASS | GROUP | PARTICIPATION AREA | SCORE |
|---|---|---|---|---|---|---|
| USER a1 | C1, C2 · · · | 3 | 2 | A | E8 | 100 |
|  |  |  |  |  | E16 | 100 |
| USER a2 | C3, C4 · · · | 2 | 4 | A | E14 | 900 |
| USER c1 | C3, C4 · · · | 1 | 5 | C | E9 | 800 |
|  |  |  |  |  | E8 | 600 |
| ⋮ | ⋮ | ⋮ | ⋮ | ⋮ | ⋮ | ⋮ |

FIG. 18

AREA DATA

| AREA ID | HOLDING GROUP | ADJACENT AREAS | AREA EFFECT | | AREA SCORE | | NUMBER OF PARTICIPATING USERS | KO FLAG |
|---|---|---|---|---|---|---|---|---|
| | | | TYPE | AFFECTED GROUPS (COLOR) | | | | |
| E1 | A | E0,E2,E4 | EFFECT2 | ALL GROUPS (BLUE) | – | | – | OFF |
| E2 | A | E1,E3,E6 | – | | – | | – | OFF |
| E8 | A | E6,E7, E16,E28 | EFFECT1 | HOLDING GROUP (GREEN) | A | 50000 | 30 | OFF |
|  |  |  |  |  | B | 65000 | 40 |  |
|  |  |  |  |  | C | 40000 | 25 |  |
| E16 | B | E8,E12, E14,E17 | EFFECT1 | GROUP HOLDING VIRTUAL AREA E8 (VIOLET) | A | 20000 | 25 | ON |
|  |  |  |  |  | B | 120000 | 80 |  |
|  |  |  |  |  | C | – | – |  |

F I G. 2 2
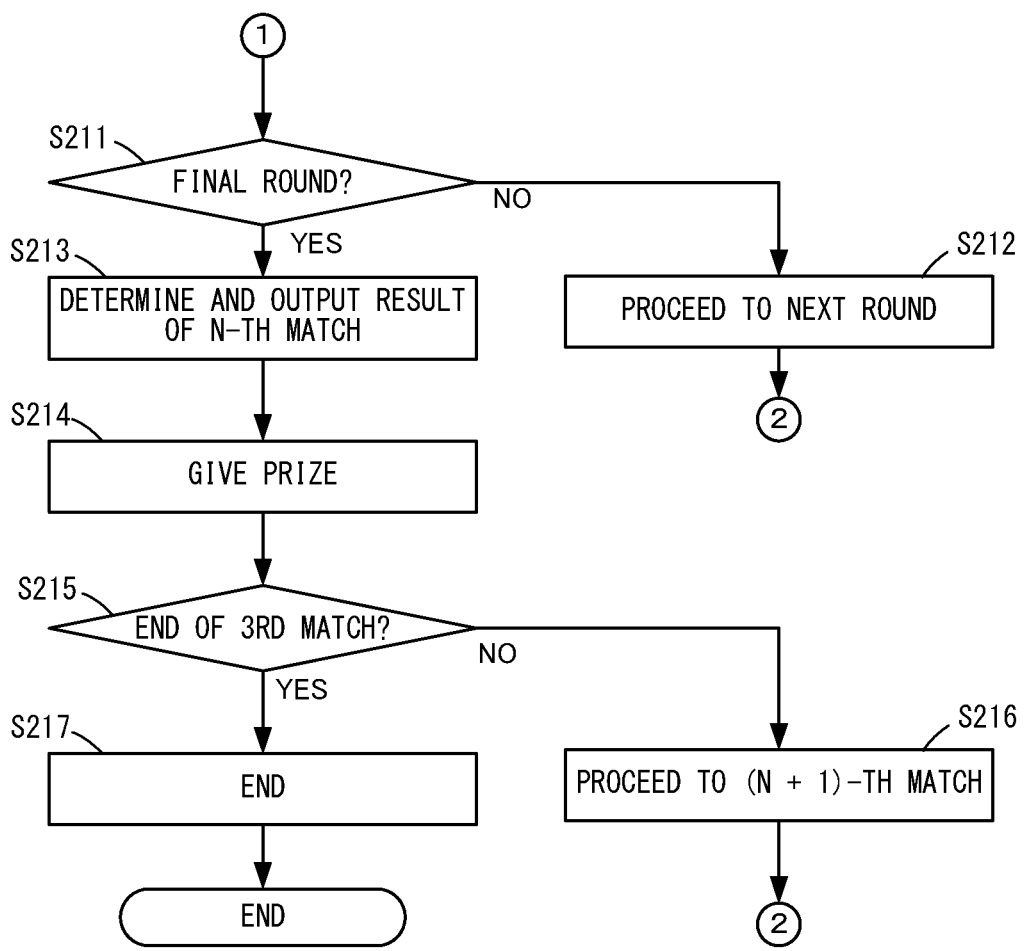

INFORMATION PROCESSING SYSTEM, INFORMATION PROCESSING METHOD, INFORMATION PROCESSING APPARATUS, AND NON-TRANSITORY STORAGE MEDIUM STORING INFORMATION PROCESSING PROGRAM FOR CONTROLLING PROGRESSION OF A GAME WITH AT LEAST ONE VIRTUAL AREA

CROSS REFERENCE TO RELATED APPLICATIONS

The disclosure of Japanese Patent Application No. 2018-074496, filed Apr. 9, 2018, is incorporated herein by reference.

FIELD

This disclosure relates to information processing systems, information processing methods, information processing apparatuses, and non-transitory storage media storing information processing programs for allowing a plurality of players to play a game.

BACKGROUND AND SUMMARY

Among conventional multiple-player participation games, in which multiple players participate simultaneously, are games in which a plurality of players are divided into a plurality of teams, and the teams compete against each other to acquire territories.

For such games in which a plurality of users compete against each other to acquire virtual points (places or positions), there is room for improvement in amusingness.

With this in mind, it is an object of this embodiment to provide an information processing system that can improve the amusingness of a game in which a plurality of users compete against each other to acquire virtual points (places or positions).

To achieve the object, this embodiment has the following configurations or features.

An information processing system according to a non-limiting example of this embodiment including a plurality of terminals configured to be operated by respective users each belonging to one of a plurality of groups, and for controlling progression of a game comprising a plurality of periods of time in which at least two of the plurality of groups compete against each other to acquire at least one virtual area, the information processing system including at least one processor and a memory, wherein the information processing system performs: executing a game process involved in a game related to a virtual area, based on operations of the users performed in at least a subset of the plurality of terminals, respectively; updating area information about the virtual area for each group, based on the progression of the game and a result of the game process executed based on the operations of the users in the at least a subset of the plurality of terminals, respectively; determining, as the game progresses, for each of the plurality of periods of time, whether a group maintains hold of the virtual area or another group acquires the virtual area based on the updated area information for each group; updating a stored association of a group and the virtual area in the memory, based on the determination for each of the plurality of periods of time, the stored association indicating a holder of the virtual area, where the game process is executed using the stored association; and outputting a result of the game in which the plurality of groups compete against each other to acquire the at least one virtual area after repeatedly performing the determining and the updating the stored association until an end condition related with the game is satisfied.

According to the above feature, the determining and the updating a stored association are performed every period of time, and therefore, the group holding the virtual area is changed every period of time. Therefore, each user plays the game, depending on which of the groups is holding the virtual area during each period of time. Therefore, the amusingness of the game in which the groups compete against each other to acquire the virtual area can be improved.

The information processing system may output the result of the game in which the plurality of groups compete against each other to acquire the at least one virtual area after performing the determining and the updating a predetermined number of times.

According to the above feature, each user can repeatedly perform the competition for the virtual area a number of times, and therefore, the amusingness of the game in which the groups compete against each other to acquire the virtual area can be improved.

The information processing system may update, as the area information, a score related to the virtual area for each group, based on the progression of the game and the result of the game process, and may determine which of the plurality of groups the virtual area is to be stored in association with, based on the score, for each of the plurality of periods time.

According to the above feature, the score related to the virtual area is updated based on the result of the game process, and the determination is performed based on the score. Therefore, it is easy for the users to understand the game.

The information processing system may cumulatively add the scores related to the virtual area for each group, based on progression of the game and the result of the game process, and may determine which of the plurality of groups the virtual area is to be stored in association with, based on the cumulative score, for each of the plurality of periods of time.

According to the above feature, the scores related to the virtual area can be cumulatively added based on the result of the game process, and the determination can be performed based on the cumulative score.

The information processing system may determine which of the plurality of groups the virtual area is to be stored in association with, based on the area information at the time that each period of time has passed.

According to the above feature, it can be determined which of the plurality of groups the virtual area is to be stored in association with, based on the area information at the time that each period of time has passed. Each user plays the game, depending on a situation until each period of time has passed. Therefore, the amusingness of the game in which the groups compete against each other to acquire the virtual area can be improved.

When the game process has been performed a plurality of times for each period of time, the information processing system may determine which of the plurality of groups the virtual area is to be stored in association with, based on a plurality of results of the game process performed the plurality of times for each period of time.

According to the above feature, it can be determined which of the plurality of groups the virtual area is to be stored in association with, based on a plurality of results of the game process performed the plurality of times for each period of time. Therefore, the amusingness of the game in which the groups compete against each other to acquire the virtual area can be improved.

The information processing system may further perform: storing user information about at least one of a user of a group who is playing the game related to the virtual area in a current period of time and another user who is playing the game related to the virtual area in the current period of time of a same group, in the memory, and updating the area information, based on the progression of the game, the result of the game process and the user information.

According to the above feature, the area information about the virtual area can be updated based on, in the addition to the progression of the game and the result of the game process, the user information about a user participating in the virtual area. Therefore, the amusingness of the game in which the groups compete against each other to acquire the virtual area can be improved.

The information processing system may store the user information into the memory in real time.

According to the above feature, the area information of the virtual area can be updated, depending on a real-time situation related to participation of a user in the virtual area. Therefore, the amusingness of the game in which the groups compete against each other to acquire the virtual area can be improved.

The information processing system may determine which of the plurality of groups the virtual area is to be stored in association with, at or after the time that each period of time has passed, if a condition is not satisfied during the period of time, and may determine which of the plurality of groups the virtual area is to be stored in association with, during each period of time, if the condition is satisfied during the period of time.

According to the above feature, even before each period of time has passed, the virtual area can be stored in association with a group if a condition is satisfied. Therefore, each user can play the game, depending on the situation. Therefore, the amusingness of the game can be improved.

The condition may be related to the area information.

According to the above feature, if the condition related to the area information is satisfied, the determination is performed even in the middle of each period of time. Therefore, the virtual area can be stored in association with a group early. As a result, each user can play the game, depending on the situation. The strategic aspects of the game can be improved.

The information processing system may further perform: limiting, if the condition is satisfied during the period of time, execution of the game process after the condition is satisfied and until the period of time has passed.

According to the above feature, if the condition is satisfied for each period of time, the execution of the game process can be limited. For example, each user can be prompted to satisfy the condition for the virtual area early and participate in another virtual area. Therefore, each user can play the game, depending on the situation. Therefore, the strategic aspects of the game can be improved.

The information processing system may further perform: limiting, if the condition is satisfied during the period of time, execution of the game process of the game related to the virtual area for which the determining has been performed, after the condition is satisfied and until the period of time has passed.

According to the above feature, if the condition is satisfied for the virtual area, the execution of the game related to the virtual area is limited. Therefore, each user can play the game, depending on the situation. Therefore, the strategic aspects of the game can be improved.

The information processing system may set an amount using a game parameter related to a user or whether or not to use the game parameter, according to an instruction of the user, and may change a value by which the area information is to be updated, based on a result of the setting.

According to the above feature, a value by which the area information is to be updated can be changed, depending on an amount using a game parameter related to a user or whether or not to use the game parameter. Each user is allowed to select the amount using the game parameter or whether or not to use the game parameter. Therefore, the amusingness of the game in which the groups compete against each other to acquire the virtual area can be improved.

The terminal may display information about a specific user who is at least one of a user who has played the game related to the virtual area and a user who is playing the game related to the virtual area, of the plurality of users, in relation to the virtual area.

According to the above feature, each user can view information about a specific user participating in the virtual area. Therefore, each user can be further motivated to participate in the game in which the groups compete against each other to acquire the virtual area.

The information processing system may update area information about a first virtual area and area information about a second virtual area related to the first virtual area, corresponding to the groups to which the users operating the terminals belong, based on a result of the game process involved in the game related to the first virtual area.

According to the above feature, based on the result of the game process, not only the point information about the first virtual area in which a user has participated, but also the area information about the second virtual area related to the first virtual area, can be updated. Therefore, each user can have various options as to which virtual area the user should participate in to play the game. Therefore, the amusingness of the game in which the groups compete against each other to acquire the virtual area can be improved.

The second virtual area may be adjacent to the first virtual area.

According to the above feature, the area information about the second virtual area adjacent to the first virtual area can be updated. Therefore, the amusingness of the game in which the groups compete against each other to acquire the virtual area can be improved.

The information processing system may further perform: setting a parameter related to each user, and updating the area information about the second virtual area, based on the parameter related to the user.

According to the above feature, the area information about the first virtual area or the area information about the second virtual area adjacent to the first virtual area can be updated, depending on the parameter of the user. Therefore, the amusingness of the game in which the groups compete against each other to acquire the virtual area can be improved.

A user may possess a character from among a plurality of character types, each character type having gaming parameters, wherein a specific effect for a character is assignable to a first virtual area, the specific effect comprises an advantage in one or more of the gaming parameters for use in the game for characters in all groups or characters in a group associated with the first virtual area, when the specific effect is for characters in the group associated with the first virtual area, the specific effect is assigned a second virtual area, the second virtual area being related to the first virtual area, where in the second virtual area characters in the group associated with the first virtual area in memory have the advantage in one or more of the gaming parameter for use in the game in the second virtual area.

If the first virtual area and a first group are stored in association with each other in the memory, the information processing system may execute the game process such that the character possessed by the user belonging to the first group has an advantage in one or more of its gaming parameters for use in the game in the second virtual area, the second virtual area being related to the first virtual area and the information processing system executes the game process without the advantage in the gaming parameters for use in the game in the second virtual area for characters possessed by users belonging to other groups.

When a group other than the first group acquires the first virtual area and is stored in associated with each other in memory, and the specific effect is assigned to the second virtual area, the characters possessed by users belonging to another group may gain the advantage in the gaming parameters.

The advantage in the one or more gaming parameters caused by the specific effect may be different for different types of characters.

The information processing system may execute the game process such that the user belonging to the first group has an advantage in the game related to the first virtual area.

The at least one virtual area comprising a plurality of virtual areas, for each virtual area, the at least one processor may perform: executing the game process for the respective virtual area; updating area information about the respective virtual area for each group, based on the progression of the game and a result of the game; determining, periodically as the game progresses, whether a group maintains hold of the respective virtual area or another group acquires the respective virtual area based on the updated area information for each group; updating a stored association of a group and the respective virtual area in the memory, based on the periodic determination, the stored association indicating a holder of the respective virtual area, where the game process is executed using the stored association; and outputting a result of the game in which the plurality of groups compete against each other to acquire the plurality of virtual areas after repeatedly performing the determining and the updating the stored association until an end condition related with the game is satisfied.

If a first virtual area and a first group are stored in association with each other, the game process may be executed such that the user belonging to the first group has an advantage in the game related to a second virtual area related to the first virtual area.

According to the above feature, if a first virtual area and a first group are stored in association with each other, then when the user belonging to the first group participates in the second virtual area related to the first virtual area to play the game, the user can have an advantage in playing the game. Therefore, the amusingness of the game in which the groups compete against each other to acquire the virtual area can be improved.

If a first virtual area and a first group are stored in association with each other, the game process may be executed such that the user belonging to the first group has an advantage in the game related to a second virtual area related to the first virtual area.

According to the above feature, each user can play the game such that the user has an advantage, by storing a previously determined first virtual area in association with the group of the user. Therefore, each user plays the game in a strategic manner, considering that the first virtual area is an important area. Therefore, the amusingness of the game in which the groups compete against each other to acquire the virtual area can be improved.

The game process may be executed such that the user belonging to the first group has an advantage in the game related to the first virtual area.

According to the above feature, if a first virtual area and a first group are stored in association with each other, when the user belonging to the first group participates in the first virtual area to play the game, the user can have an advantage in playing the game. Therefore, the amusingness of the game in which the groups compete against each other to acquire the virtual area can be improved.

In another embodiment, an information processing method for use in the information processing system may be provided. In still another embodiment, a server that executes the processes of the information processing system, or a program executable in the server, may be provided.

According to this embodiment, a group that is stored in association with a virtual point is changed every predetermined period of time. Therefore, each user can play the game, depending on which of the groups the virtual point is stored in association with. Therefore, the amusingness of the game in which the groups compete against each other to acquire the virtual point can be improved.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 6 is an example non-limiting diagram showing an example non-limiting assignment of users to groups, FIG. 7 is an example non-limiting diagram showing an overview of holding determination, FIG. 13 is an example non-limiting diagram showing example non-limiting specific effects that are present in virtual areas, FIG. 14 is an example non-limiting diagram showing an example non-limiting relationship between user classes and proportions of a score added to an adjacent virtual area, FIG. 15 is an example non-limiting diagram showing example non-limiting data stored in the user terminal 3, FIG. 16 is an example non-limiting diagram showing example non-limiting data stored in a memory 26 of the server 2, FIG. 17 is an example non-limiting diagram showing example non-limiting user data stored in the server 2, FIG. 18 is an example non-limiting diagram showing example non-limiting area data stored in the server 2, FIG. 22 is an example non-limiting flowchart showing an example non-limiting process following step S210 of FIG. 20.

DETAILED DESCRIPTION OF NON-LIMITING EXAMPLE EMBODIMENTS (Configuration of Entire Information Processing System)

Figure 1:
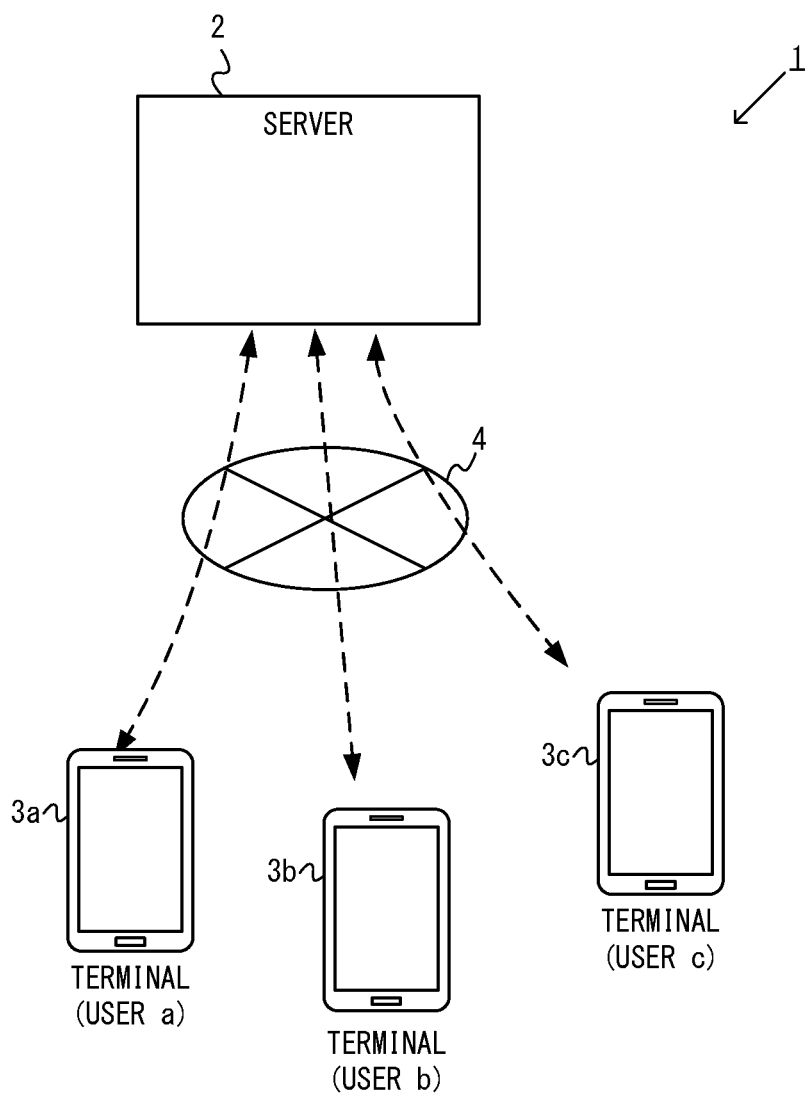
FIG. 1 is an example non-limiting diagram showing an example non-limiting configuration of an information processing system 1 according to this embodiment.

A game system (an example non-limiting information processing system) according to this embodiment will now be described with reference to the accompanying drawings. FIG. 1 is an example non-limiting diagram showing an example non-limiting configuration of an information processing system 1 according to this embodiment. As shown in FIG. 1, the information processing system 1 includes a server 2 and a plurality of user terminals 3 (3*a*-3*c* in FIG. 1). The server 2 and the user terminals 3 are connected together through the Internet 4, which is an example non-limiting network. The information processing system 1 executes a multiple-player participation game using the user terminals 3 and the server 2. Specifically, in this embodiment, played is a multiple-player participation game in which a plurality of users are separated into a plurality of groups, and the groups compete against each other to acquire virtual areas (example non-limiting virtual points). The multiple-player participation game in which groups compete against each other to acquire virtual areas is hereinafter referred to as a "multiplayer game".

The server 2 is connected to the Internet 4 through wired communication (or wirelessly communication). The server 2 includes at least one information processing unit (CPU), a RAM, and a memory. The term "server" used herein may include a single processing unit or multiple processing units in wired or wireless communication with each other and distributed in separate places, and connectable via the Internet and/or the cloud. The functionality, features, instructions or processes described herein may be executed by the single processing unit or collectively or collaboratively by the multiple processing units, where each processing unit of the "server" is not required to perform every function, feature or instruction, individually. The server 2 executes an information processing program for performing the multiplayer game of this embodiment. The server 2 may also include a memory 26 that are disposed at physically separated places, and are connected together through a network (e.g., the Internet).

The user terminals 3 are, for example, a smartphone, mobile telephone, tablet terminal, personal computer, handheld or stationary game console, etc. The user terminals 3 may be either the same or different types of terminals. For example, some of the user terminals 3 may be a smartphone, and another some of the user terminals 3 may be a tablet terminal. The user terminals 3 may also have different types of operating systems (OS). It is herein assumed that the user terminals 3 are a smartphone, as an example. For example, the user terminals 3 can be connected to a mobile communication network (i.e., a mobile telephone communication network), and can serve as a mobile telephone. The user terminals 3 are connected to the Internet 4 through the mobile communication network. It should be noted that the user terminals 3 may have the function of connecting to a wireless LAN, and may be connected to the Internet 4 through at least one of the wireless LAN and the mobile communication network.

As shown in FIG. 1, for example, the user terminal 3*a* is used by a user a, the user terminal 3*b* is used by a user b, and the user terminal 3*c* is used by a user c. In addition to the user terminals 3*a*-3*c*, a large number of user terminals 3 are connected to the server 2 through the Internet 4.

A predetermined game application is installed in all of the user terminals 3. The users execute the game application on the respective user terminals 3 to play a predetermined game.

Figure 2:
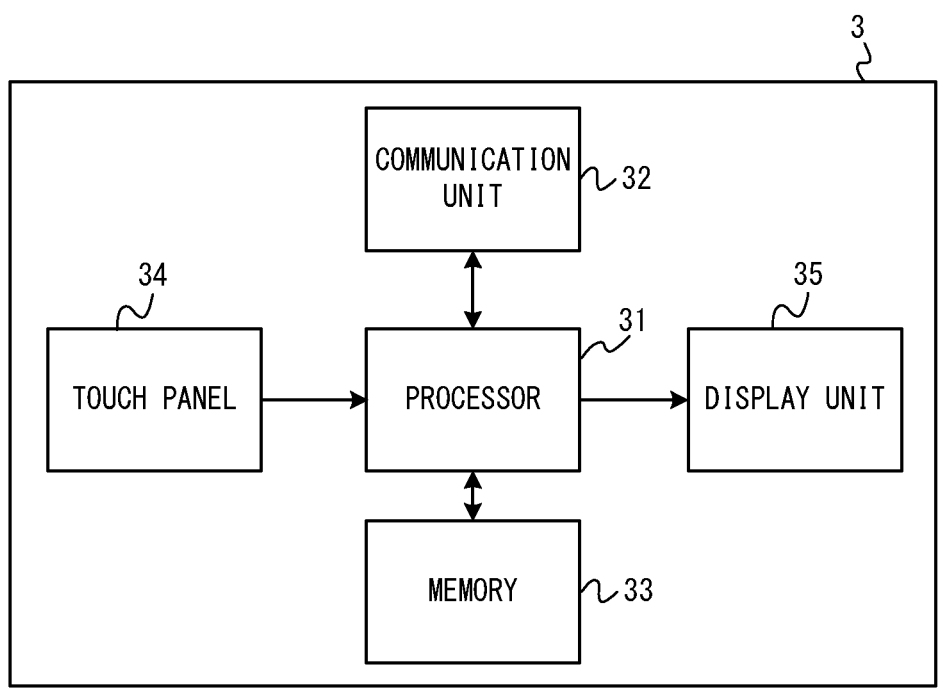
FIG. 2 is an example non-limiting block diagram showing an example non-limiting configuration of a user terminal 3.

FIG. 2 is an example non-limiting block diagram showing an example non-limiting configuration of the user terminal 3. The user terminal 3 includes at least one processor 31, a communication unit 32, a memory 33, a touch panel 34, and a display unit 35.

The processor 31 executes a game application program in corporation with, for example, a RAM (not shown). In addition to the game application program of this embodiment, the processor 31 can execute any other suitable application programs.

The communication unit 32, which is a communication module for connecting to the Internet 4, includes an antenna and a communication control circuit. The communication unit 32 communicates with the server 2 through the Internet 4.

The memory 33, which is, for example, a non-volatile memory, stores the game application program of this embodiment or various pieces of setting information.

The touch panel 34 is an input unit that receives an input from a user. The touch panel 34, which is provided on the screen of the display unit 35, detects the position of a touch by the user on the screen.

The display unit 35, which is a display device that shows letters, images, etc., on the screen, may be a liquid crystal display device, organic EL display device, etc., for example.

In addition, the user terminal 3 may include a loudspeaker, battery, etc. The user terminal 3 may also include a button that is operated by the user.

(Overview of Multiplayer Game)

Figure 3:
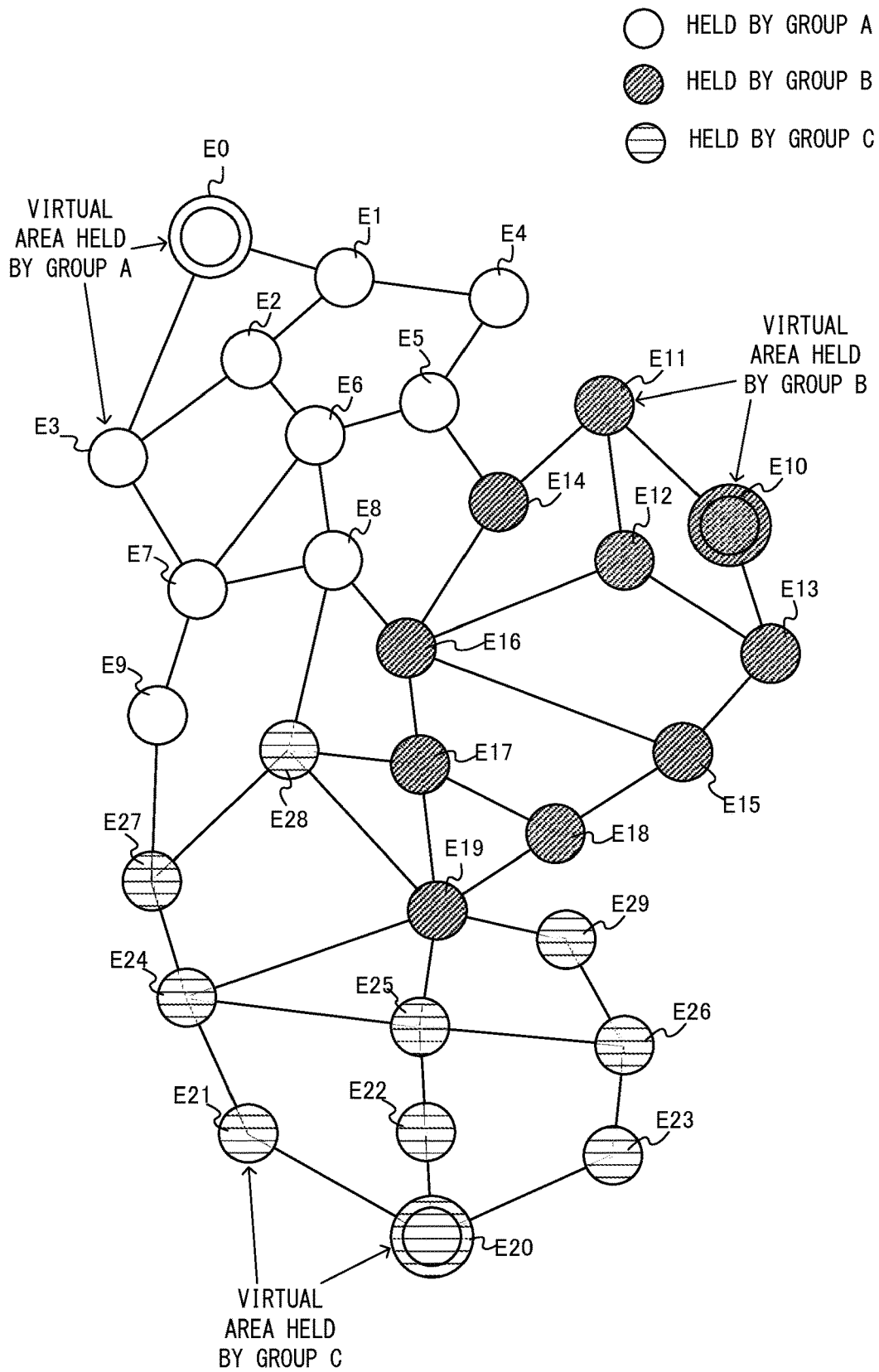
FIG. 3 is an example non-limiting diagram roughly showing a multiplayer game that is played by a plurality of users in the information processing system 1 of this embodiment, indicating an example non-limiting situation that a plurality of virtual areas are held.

FIG. 3 is an example non-limiting diagram roughly showing the multiplayer game that is played by a plurality of users in the information processing system 1 of this embodiment, indicating an example non-limiting situation that a plurality of virtual areas are held.

In the multiplayer game of this embodiment, each user belongs to any one of the groups (e.g., three groups), and the groups compete against each other to grab virtual areas. As shown in FIG. 3, in the server 2, for example, three groups A-C and 30 virtual areas are defined. Each user is assigned to one of the three groups A-C. The server 2 stores information indicating by which of the three groups A-C each virtual area is held. As used herein, the term "hold" with respect to a virtual area and a group means that the virtual area belongs to the group.

Circles shown in FIG. 3 each indicate a virtual area (virtual point). As used herein, the term "virtual point" refers to a position, region, place, etc., in virtual space, including a one-dimensional position, two-dimensional region, and three-dimensional space.

In the virtual space, for example, 30 virtual areas (virtual areas E0-E9, E10-E19, and E20-E29) are defined. In the situation shown in FIG. 3, the virtual areas E0-E9 are held by the group A, the virtual areas E10-E19 are held by the group B, and the virtual areas E20-E29 are held by the group C. It should be noted that, in FIG. 3, an open circle indicates being held by the group A, a circle hatched with diagonal lines indicates being held by the group B, and a circle hatched with horizontal lines indicates being held by the group C. In the description that follows, for example, a virtual area held by the group A may be referred to as "the group A's virtual area".

Each group aims to grab a virtual area belonging to an opponent group, and thereby increase virtual areas belonging to itself. It is assumed that a group that holds the greatest number of virtual areas at the end of the multiplayer game is the winner of the multiplayer game.

Figure 4:
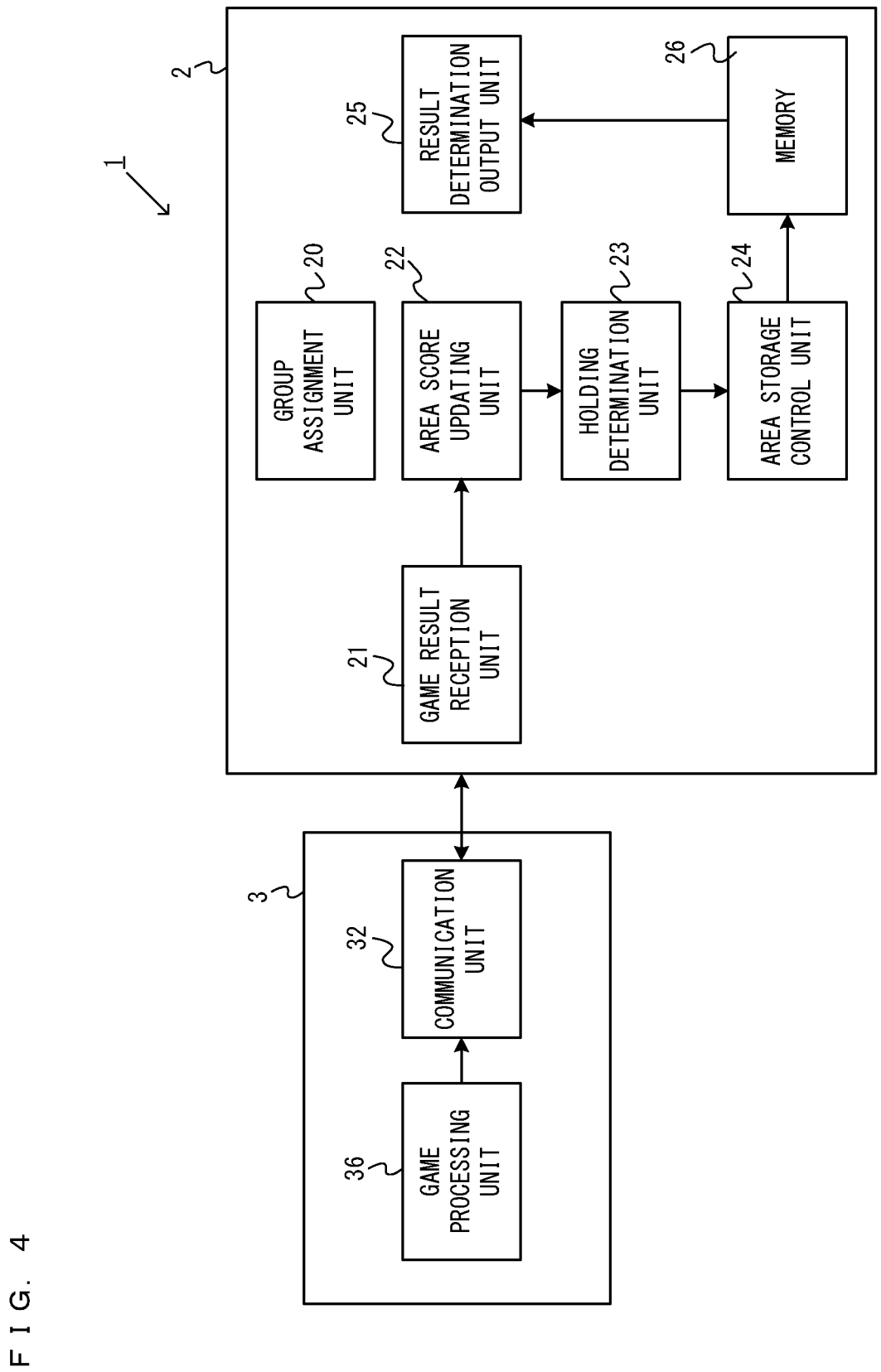
FIG. 4 is an example non-limiting block diagram showing an example non-limiting functional configuration of the information processing system 1 of this embodiment.

FIG. 4 is an example non-limiting block diagram showing an example non-limiting functional configuration of the information processing system 1 of this embodiment. As shown in FIG. 4, the user terminal 3 includes a game processing unit 36. The game application stored in the memory 33 of the user terminal 3 causes the processor 31 to function as the game processing unit 36.

The game processing unit 36 of the user terminal 3 executes a game process involved in a fighting game described below, according to an operation of the user of the user terminal 3. As described in detail below, the user uses the user terminal 3 to specify a virtual area (virtual point) where the fighting game is to be executed, and executes the fighting game in the virtual area. The game processing unit 36 sends the result of the game process of the fighting game to the server 2 through the communication unit 32.

Meanwhile, the server 2 includes a group assignment unit 20, a game result reception unit 21, an area score updating unit 22, a holding determination unit 23, an area storage control unit 24, a result determination output unit 25, and a memory 26. A server program of the server 2 causes the CPU to function as the units (20-25) shown in FIG. 4.

The group assignment unit 20 assigns each user to one of a plurality of groups. The group assignment unit 20 assigns each user to one of the groups A-C such that substantially an equal number of users belong to each group. For example, when 600 users participate in the multiplayer game of this embodiment, the group assignment unit 20 assigns each of the 600 users to one of the groups A-C such that 200 users belong to each group.

The game result reception unit 21 receives, from each user terminal 3, the result of the fighting game performed by the game processing unit 36. When receiving the result of the game process, the game result reception unit 21 outputs the result to the area score updating unit 22.

The area score updating unit 22 updates an area score value of each virtual area. Specifically, the area score updating unit 22 obtains the result of the fighting game performed in each user terminal 3, and adds a score corresponding to the result to the area score of a group to which a user corresponding to the user terminal 3 (i.e., the sender of the result of the fighting game) belongs. For example, when a user belonging to the group A has performed the fighting game in the virtual area E8, the area score updating unit 22 adds a score value corresponding to the result of the fighting game to the area score value of the group A in the virtual area E8.

The holding determination unit 23 performs holding determination for each virtual area, based on the most recent area score updated by the area score updating unit 22, every predetermined period of time (e.g., 2 hours). As used herein, the term "holding determination" with respect to a virtual area refers to determining to which of the groups A-C the virtual area is to belong.

If the holding determination unit 23 has performed the holding determination, the area storage control unit 24 stores a group that the holding determination unit 23 has determined holds a virtual area, in association with the virtual area, in the memory 26. In other words, the memory 26 stores information indicating which group holds which virtual area, and updates the information every predetermined period of time.

The holding determination by the holding determination unit 23, and the storage of the information indicating which group holds which virtual area into the memory 26 by the area storage control unit 24, are repeatedly performed a predetermined number of times (e.g., 22 times). After the holding determination by the holding determination unit 23 and the storage into the memory 26 have been repeatedly performed the predetermined number of times, the result determination output unit 25 determines which of the groups has won the multiplayer game, and outputs the result of the determination. Specifically, the result determination output unit 25 outputs the result of the multiplayer game to each user terminal 3. The result determination output unit 25 also gives a prize to users who have won, based on the result of the multiplayer game. Each user terminal 3 displays the result of the multiplayer game, and information about a given prize.

Figure 5:
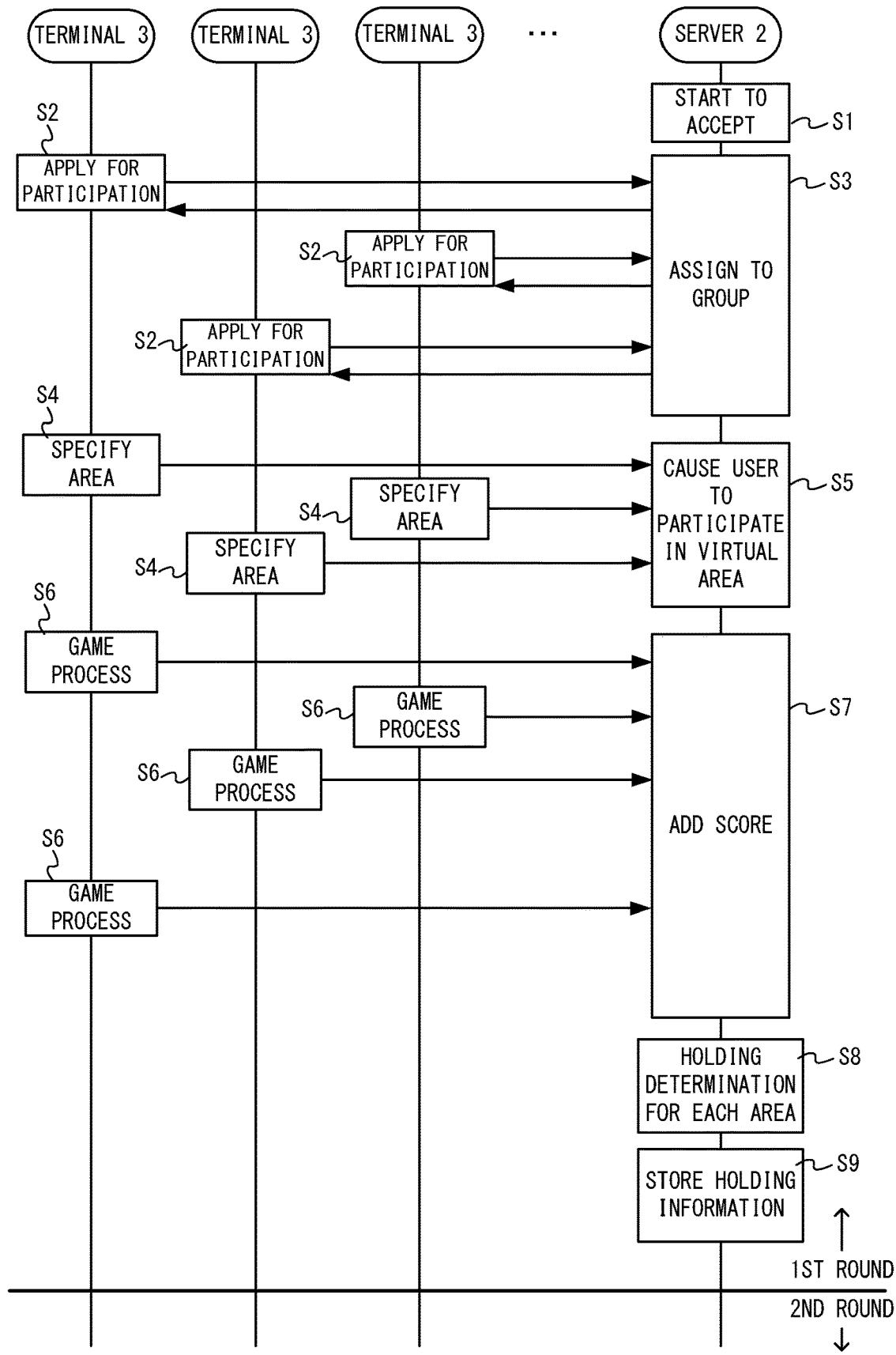
FIG. 5 is an example non-limiting diagram showing flows of processes performed in the user terminal 3 and a server 2 when a multiplayer game is played.

FIG. 5 is an example non-limiting diagram showing flows of processes performed in the user terminals 3 and the server 2 when the multiplayer game is played.

As shown in FIG. 5, the server 2 starts accepting users' participation in the multiplayer game at an appropriate timing (step S1). After the server 2 has started accepting users' participation in the multiplayer game, each user applies for participation in the multiplayer game using their own user terminal 3 (step S2). In response to each user's application for participation from their user terminal 3, the server 2 assigns the user applying for participation to one of the three groups (step S3). If the server 2 has assigned a user to one of the three groups, the server 2 sends, to the user, information indicating the group to which the user has been assigned.

A plurality of users have previously been registered in the server 2, which stores information about each user. For example, the server 2 stores the type and level of a character possessed by each user, the skill level in the game of each user, etc. Based on these pieces of information about the users, the server 2 assigns each user to one of the three groups. Specifically, the server 2 assigns each user to one of the three groups such that substantially an equal number of users belong to each group. The server 2 also assigns each user to one of the three groups based on the skill level of the user. For example, the server 2 assigns each user to one of the three groups such that an unfair situation that one group has a greater number of users having a relatively high skill level than the other groups is avoided.

FIG. 6 is an example non-limiting diagram showing an example non-limiting assignment of the users to the groups. As shown in FIG. 6, the server 2 stores the user ID of each user in association with information for identifying a group. For example, users a2-a3 belong to the group A, users b1-b3 belong to the group B, and users c1-c3 belong to the group C. The users are each assigned to a group such that substantially an equal number of users belong to each group. For example, 200-300 users are assigned to each group.

Referring back to FIG. 5, after a predetermined period of time has passed since the start of acceptance of application for participation in the multiplayer game, the server 2 starts the multiplayer game. It should be noted that even after the start of the multiplayer game, users can participate in the middle of the multiplayer game.

After the start of the multiplayer game, each user specifies one of the virtual areas where the user is to play the fighting game, using their own user terminal 3 (step S4). If a user has specified a virtual area, information about the specified virtual area is sent to the server 2. Based on this information, the server 2 causes the user to participate in the virtual area specified by the user (step S5).

In each user terminal 3, after the user of the user terminal 3 has specified a virtual area, a game process involved in the fighting game is performed (step S6). In the game process, the fighting game is executed according to an operation performed on the user terminal 3. In the fighting game, the user causes a user character possessed by themselves to fight against an enemy character that is controlled by the processor 31 of the user terminal 3. If the user has won the fighting game, the user obtains a score corresponding to the result of the game. The result of the fighting game is sent to the server 2.

The server 2 receives the result of the fighting game performed in each user terminal 3, and adds a score obtained by the user of the user terminal 3 in the fighting game, to a group to which the user belongs (step S6). Specifically, the server 2 manages the score of each group for each virtual area. The server 2 adds a score obtained by a user in the current fighting game in a virtual area specified by the user, to the area score of a group to which the user belongs. For example, it is assumed that the user a1 belonging to the group A designates the virtual area E8 and plays the fighting game. In this case, if the user a1 has won the fighting game, the value of a score given to the user a1 in the fighting game is added to the area score of the group A in the virtual area E8. It is also assumed that the user b1 belonging to the group B designates the virtual area E8 and plays the fighting game. In this case, if the user b1 has won the fighting game, the value of a score given to the user b1 in the fighting game is added to the area score of the group B in the virtual area E8.

Scores are added up based on the results of the fighting game performed in the large number of user terminals 3. In each virtual area, the area scores of each group are accumulated. The execution of the fighting game by the user terminals 3 and the adding up of scores in the fighting game are performed for a predetermined period of time (e.g., 2 hours). After the predetermined period of time has passed, the server 2 performs the holding determination for each virtual area (step S8). The server 2 stores, into the memory, information indicating by which of the groups each virtual area is held, based on the result of the holding determination for each virtual area (step S9).

After the execution of steps S5-S9, the server 2 ends the first round of the multiplayer game, and then starts the second round of the multiplayer game. In the second round, steps S5-S9 are performed again. In this embodiment, such a round is performed a plurality of times. At the end of the final round, it is determined which of the groups holds the greatest number of virtual areas.

FIG. 7 is an example non-limiting diagram showing an overview of the holding determination. In FIG. 7, shown is the score value of each group in the virtual area E8 at a certain time point.

The area score value of each group is the sum of score values obtained by the users belonging to the group who have played the fighting game. For example, it is assumed that, in a certain round, the users a1-a3 of the group A participate in the virtual area E8. The sum of score values obtained by the users a1-a3 performing the fighting game is calculated as the area score value of the group A. In the holding determination of step S8, based on the area score values of the groups A-C, it is determined which of the groups A-C holds the virtual area E8. Specifically, it is determined that a group having the highest area score holds the virtual area E8.

For example, it is assumed that at the time that a predetermined period of time (2 hours) has just passed since the start of a certain round, the area score values of the groups B, A, and C are "100,000", "95,000", and "70,000", respectively. In this case, in the holding determination of step S8, it is determined that the group B holds the virtual area E8. Thereafter, in step S9, information indicating that the group B holds the virtual area E8 is stored. The next round is started with the group B holding the virtual area E8. In the next round, the area score value of each group accumulated in the previous round is reset to "0".

Here, if the difference in area score value between the first-ranked group and the second-ranked group has reached a value greater than or equal to a threshold (e.g., 100,000) before the end of a round (i.e., before the predetermined period of time has passed since the start of the round), it is determined at that time that the first-ranked group (i.e., the group having the highest area score value) holds the virtual area. The situation that the difference in area score value between the first-ranked and second-ranked groups has reached a value greater than or equal to a threshold before the end of a round, is referred to as "knockout". Once knockout has occurred in a virtual area in a round, no user can play the fighting game in the virtual area until the end of the round. When it has been determined that knockout has occurred in the middle of a round, the next round is started after the predetermined period of time has passed since the start of the round. In this case, the next round is started with the group B holding the virtual area E8.

Figure 8:
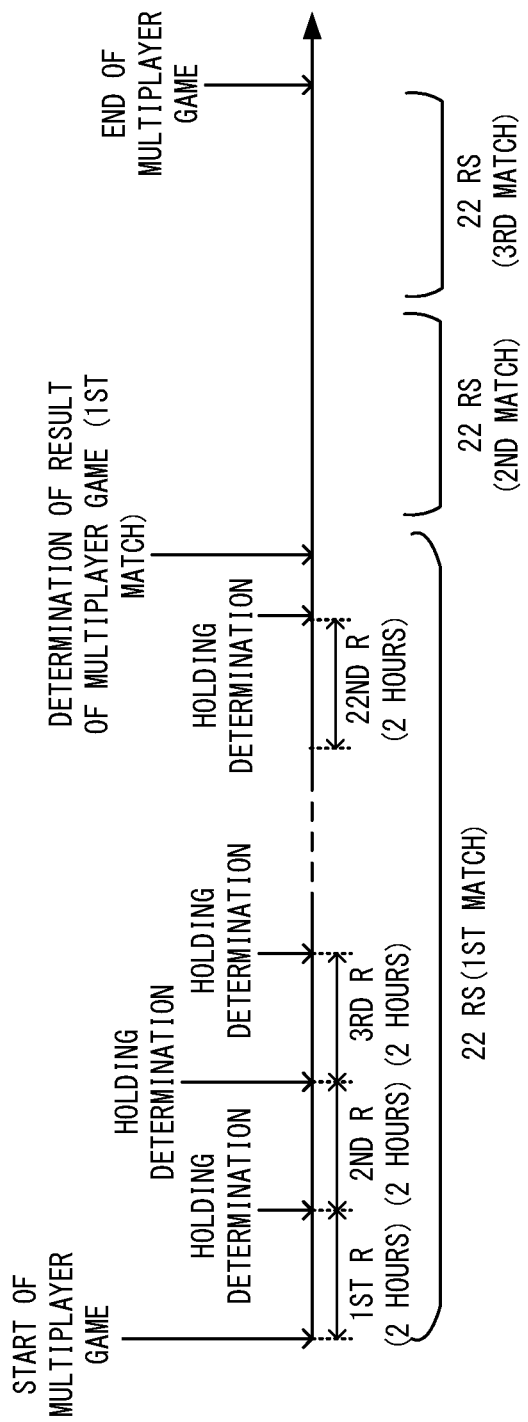
FIG. 8 is an example non-limiting diagram showing an overview of the entire multiplayer game of this embodiment.

FIG. 8 is an example non-limiting diagram showing an overview of the entire multiplayer game of this embodiment. As shown in FIG. 8, 22 rounds, each of which is performed for a predetermined period of time (e.g., 2 hours), are performed. After the end of the 22nd round, the result of a match of the multiplayer game is determined. For example, the first round is started with each of the three groups holding 10 virtual areas (see FIG. 3). The groups compete against each other to acquire virtual areas, and the number of virtual areas held by each group varies from round to round.

For example, it is assumed that, in the first round, the group A has seized the virtual area E16 held by the opponent group B. In this case, in the second round, it is assumed that the virtual area E16 is held by the group A. The virtual area E16 held by the group A may be seized by the group B or C in the second round. Thus, the groups A-C compete against each other to acquire a plurality of virtual areas in each round.

At the end of the final round (22nd round), it is determined which of the groups A-C holds the greatest number of virtual areas. The result of the determination is displayed as the result of a match of the multiplayer game.

In this embodiment, three (first to third) matches are performed, two days for each match. The end of the third match is the end of the multiplayer game. It should be noted that each user may belong to the same group to which the user is originally assigned, in all the three (first to third) matches. Alternatively, at the start of each match, step S3 may be performed. In other words, a plurality of users may be newly separated into groups every "match".

Figure 9:
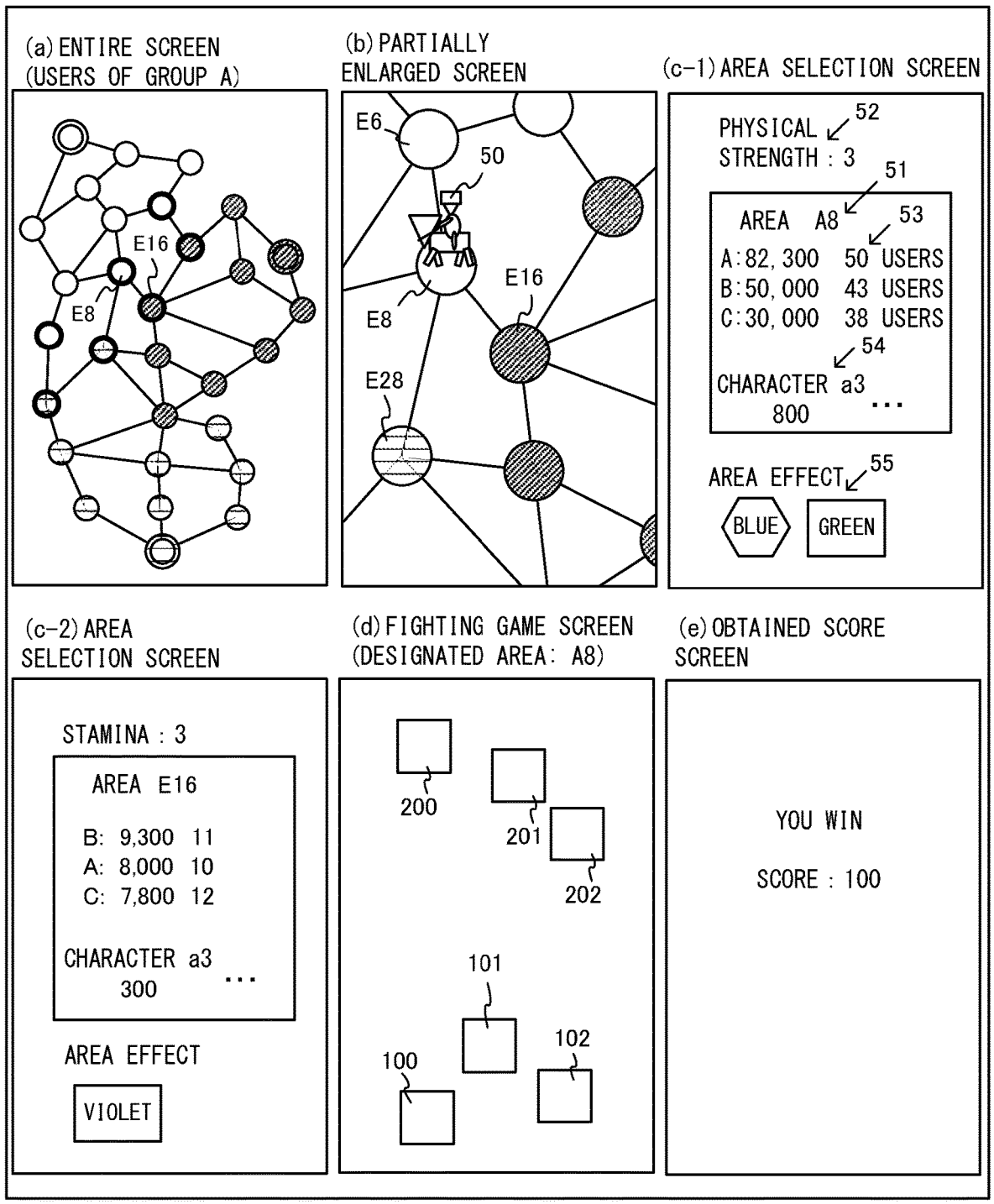
FIG. 9 is an example non-limiting diagram showing example non-limiting images displayed on a screen of the user terminal 3.

Next, the multiplayer game will be described in greater detail with reference to example non-limiting images displayed on the screen of the display unit 35 of the user terminal 3. FIG. 9 is an example non-limiting diagram showing example non-limiting images displayed on the screen of the user terminal 3. In FIG. 9, shown are example non-limiting images on the screen of the user terminal 3 of the user a1 belonging to the group A.

As shown in an entire screen (a) of FIG. 9, at the start of the multiplayer game, the entire screen is displayed on the display unit 35 of the user terminals 3. The entire screen displays an image of the entire virtual space, indicating which virtual area is held by which group. On the entire screen, the user a1 specifies one of the virtual areas (circles) by tapping the screen. Here, some of the virtual areas can be specified by the user while the other cannot be specified by the user (i.e., the user can participate in some of the virtual areas and cannot participate in the other virtual areas).

Figure 10:
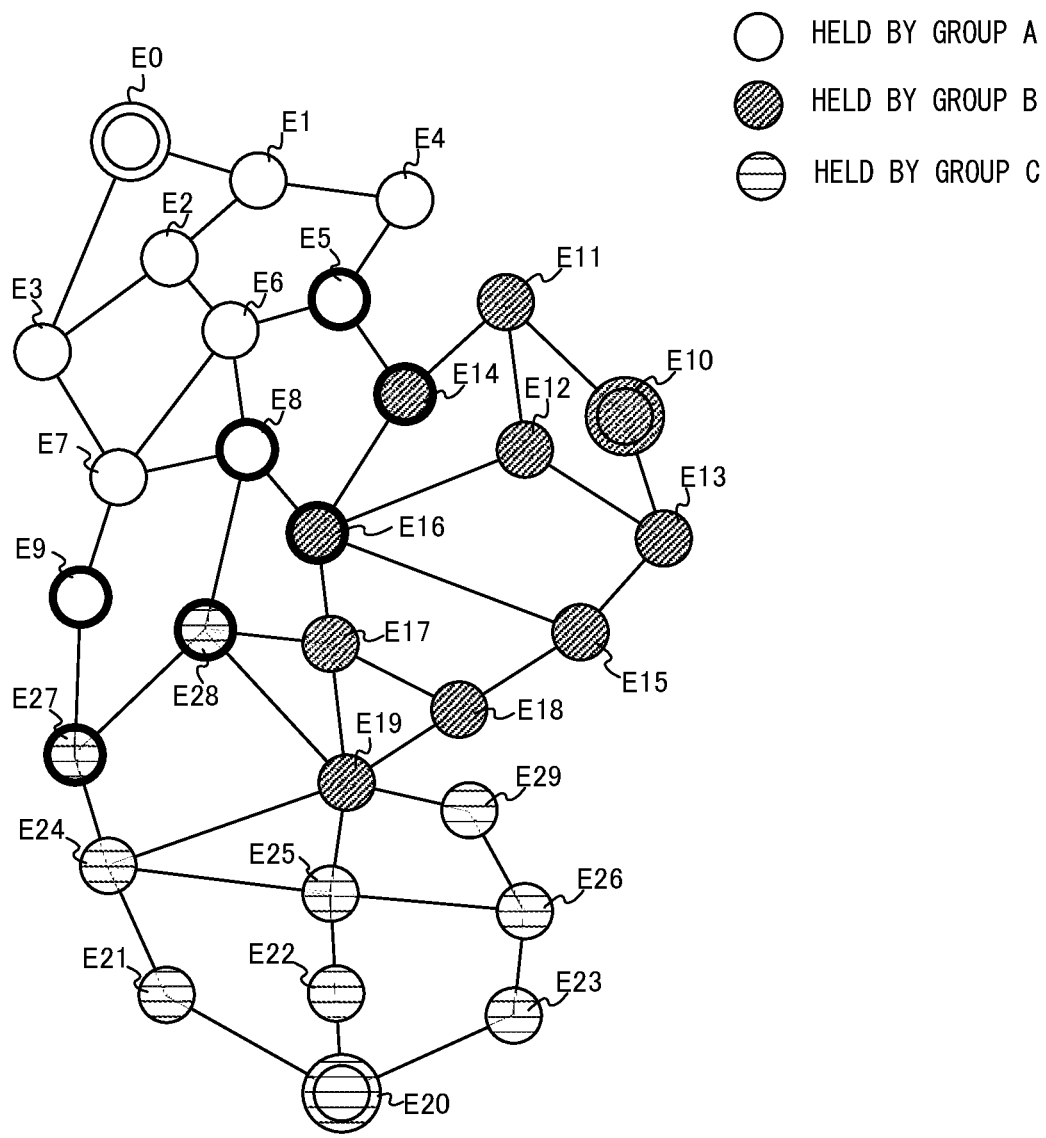
FIG. 10 is an example non-limiting diagram showing example non-limiting virtual areas that can be designated by users belonging to a group A.

FIG. 10 is an example non-limiting diagram showing example non-limiting virtual areas that can be designated by the users belonging to the group A. In FIG. 10, the outer edge of each virtual area that can be designated by a user is indicated by a thick solid line. Each user can specify one of their own virtual areas that are adjacent to virtual areas held by the opponent groups, or virtual areas of the opponent groups that are adjacent to virtual areas of the user's group.

As shown in FIG. 10, the users belonging to the group A can specify any of the virtual areas E8, E16, E5, E14, E28, E9, and E27. Here, any two virtual areas connected by a line segment are considered to be adjacent to each other. Conversely, any two virtual areas not connected to each other by a line segment are considered not to be adjacent to each other.

As shown in FIG. 10, the virtual area E8 of the group A is adjacent to the virtual area E16 of the opponent group B. Therefore, the users belonging to the group A can designate the virtual area E8. The virtual area E16 of the group B is adjacent to the virtual area E8 of the group A, and therefore, the users belonging to the group A can designate the virtual area E16. The virtual area E5 of the group A is adjacent to the virtual area E14 of the group B, and therefore, the users belonging to the group A can designate the virtual area E5. The virtual area E14 of the group B is adjacent to the virtual area E5 of the group A, and therefore, the users belonging to the group A can designate the virtual area E14. The virtual area E28 of the group C is adjacent to the virtual area E8 of the group A, and therefore, the users belonging to the group A can designate the virtual area E28. The virtual area E27 of the group C is adjacent to the virtual area E9 of the group A, and therefore, the users belonging to the group A can designate the virtual area E27. The virtual area E9 of the group A is adjacent to the virtual area E27 of the group C, and therefore, the users belonging to the group A designates the virtual area E9.

As shown in the entire screen (a) of FIG. 9, virtual areas that can be designated by the user are displayed on the screen of the user terminal 3 so that the user can recognize which of the virtual areas can be designated. For example, a virtual area that can be designated by the user may be displayed in a flickering pattern or different color. Alternatively, the outer edge of such a virtual area may be displayed in a thicker solid line than that of a virtual area that cannot be designated by the user.

It should be noted that a virtual area in which knockout has occurred in the current round cannot be designated by the user. The screen of the user terminal 3 displays a virtual area in which knockout has occurred, in a manner that allows the user to recognize the knockout.

Although FIG. 10 shows the screen of the user terminal 3 of a user belonging to the group A, an image different from that of FIG. 10 is displayed on the user terminals 3 of users belonging to the other groups.

Figure 11:
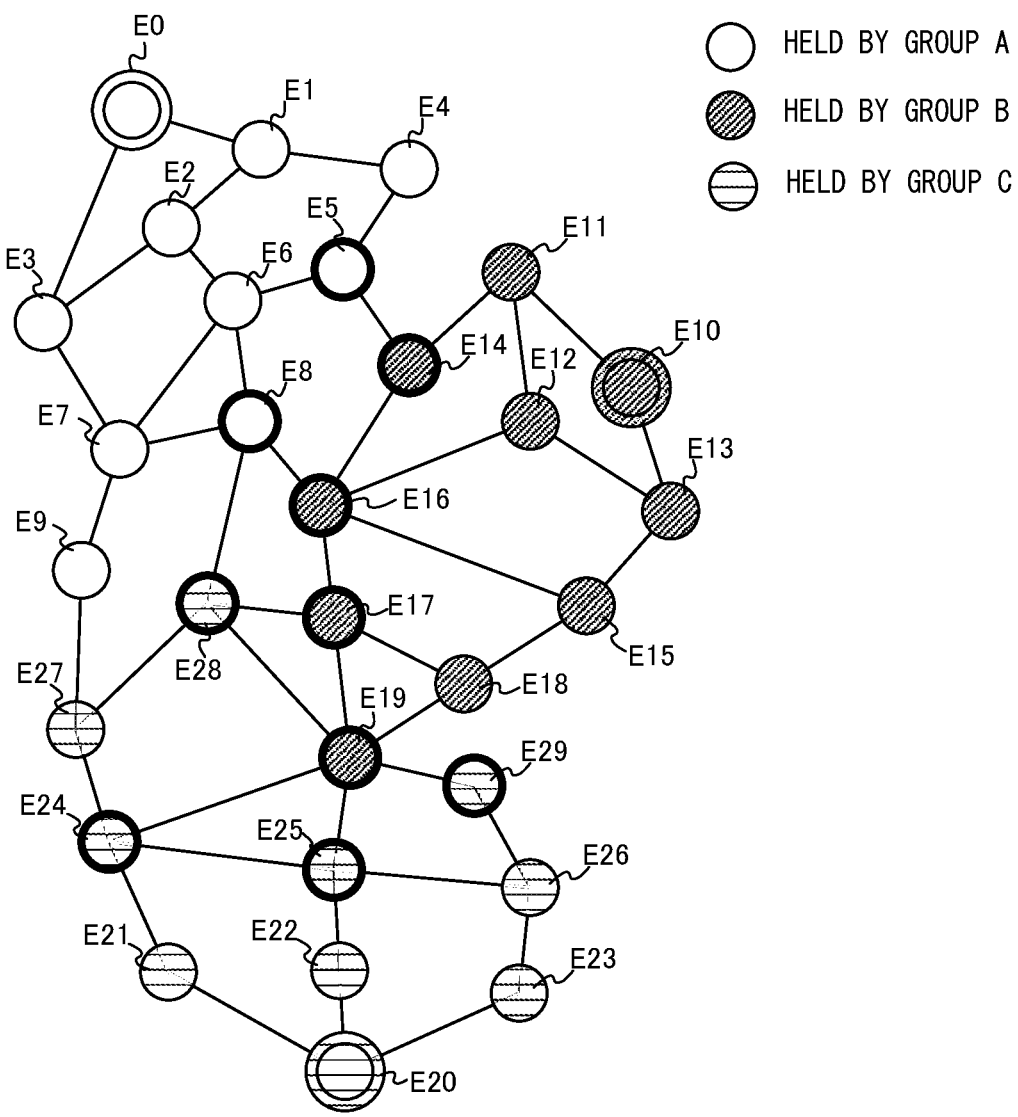
FIG. 11 is an example non-limiting diagram showing an example non-limiting entire screen displayed on the screen of the user terminal 3 of a user belonging to a group B.

FIG. 11 is an example non-limiting diagram showing an example non-limiting entire screen displayed on the screen of the user terminal 3 of a user belonging to the group B. As shown in FIG. 11, in the user terminal 3 of the user belonging to the group B, the user belonging to the group B can designate the virtual areas E5, E14, E8, E16, E17, E28, E19, E29, E25, and E24. These virtual areas are a virtual area of their own group (group B) that is adjacent to one of an opponent group (group A or C), or a virtual area of an opponent group (group A or C) that is adjacent to one of their own group (group B). These virtual areas that can be designated by the users and the other virtual areas that cannot be designated by the users are displayed in different display forms.

Referring back to FIG. 9, when the user taps a portion of the entire screen (a) of FIG. 9, a region around the tapped position is enlarged and displayed (a partially enlarged screen (b) of FIG. 9). In the partially enlarged screen (b) of FIG. 9, a character image 50 is displayed on an icon (circle) indicating a virtual area. The character image 50 indicates a user character of the user belonging to their own group that is active in the virtual area in the current round. For example, the user terminal 3 of a user belonging to the group A displays the character image 50 on an icon indicating the virtual area E8. The character image 50 indicates a user character of a user who has obtained the highest score, of the users belonging to the group A who are playing, or have played in the current round, the fighting game in the virtual area E8. It should be noted that a user character of a user who is most active (has the highest score) of all the groups including their own group, on an icon indicating a virtual area.

When a user taps a specific virtual area on the entire screen (a) of FIG. 9 or the partially enlarged screen (b) of FIG. 9, an area selection screen (c-1) of FIG. 9 is displayed. As shown in the area selection screen (c-1) of FIG. 9, a selected area display 51 indicating a selected virtual area is displayed in the area selection screen. In this example, the "virtual area E8" is displayed as a selected virtual area.

In addition, the area selection screen (c-1) displays a physical strength display 52 indicating a physical strength value of the user. In this embodiment, the fighting game is played in the user terminal 3 by the physical strength value indicated by the physical strength display 52 being consumed. The user can select a physical strength value to be consumed. The score value that is obtained by a user who has won the fighting game increases with an increase in the consumed physical strength value. For example, when the fighting game is played by the physical strength value "1" being consumed, then if a user has won the fighting game, the user obtains a normal score value. Meanwhile, when the fighting game is played by the physical strength value "3" being consumed, then if a user has won the fighting game, the user obtains a score value that is three times as great as the normal score value. Thus, a user who has won the fighting game is given a score value corresponding to the physical strength value specified by the user. As a result, the user can quickly obtain a high score, which can be added to the group to which the user belongs. In addition, for example, when there is a certain difference in score between the first-ranked and second-ranked groups at a certain virtual point, then if a user belonging to the first-ranked group consumes a greater physical strength value to obtain a higher score, the user can contribute to knockout. Conversely, if a user belonging to the second-ranked group consumes a greater physical strength value to obtain a higher score, the difference from the first-ranked group can be reduced to avoid knockout.

The area selection screen (c-1) of FIG. 9 also displays a situation display 53 indicating a current situation of the virtual area E8. Specifically, as the situation display 53, the area score value of each group in the virtual area E8 is displayed. For example, in the example non-limiting area selection screen (c-1) of FIG. 9, the current area score value of the group A is "82,300", the current area score value of the group B is "50,000", and the current area score value of the group C is "30,000". The group A is currently the favorites to win the fighting game. The situation display 53 also shows the number of users participating in the virtual area E8 for each group. As used herein, the term "user participating in the virtual area E8" refers to a user who is currently playing the fighting game with the virtual area E8 being designated, or has played the fighting game in the current round with the virtual area E8 being designated. For example, 10 users belonging to the group A are currently playing the fighting game with the virtual area E8 being designated, and 40 users belonging to the group A who have played the fighting game in the current round with the virtual area E8 being designated (including a user who is currently playing the fighting game in another virtual area, and a user who is not currently playing the game using the user terminal 3), "50 users" is displayed as the number of users belonging to the group A who are participating in the virtual area E8. For example, in the area selection screen (c-1) of FIG. 9, the number of users belonging to the group A who are participating in the fighting game is "50 users", the number of users belonging to the group B who are participating in the fighting game is "43 users", and the number of users belonging to the group C who are participating in the fighting game is "38 users". A score value added to a group increases with an increase in the number of users belonging to the group who are participating in the fighting game.

The area selection screen (c-1) of FIG. 9 also displays an active user display 54. For example, the active user display 54 shows information about the three highest-ranked users having the highest score values of all the users of their own group who are currently participating in the virtual area E8. Specifically, the user characters of the three highest-ranked users having the highest score values, and the score values of these users, are displayed. It should be noted that information about the three highest-ranked users having the highest score values of all the users of all the groups, may be displayed as the active user display 54.

The area selection screen (c-1) of FIG. 9 also displays an area effect icon(s) 55 in some cases. Each area effect icon 55 indicates a specific effect that is present in the virtual area E8. According to the area effect icons 55, the user recognizes what kind of effect is present in the virtual area, which of the virtual areas the specific effect affects, and which of the groups the specific effect affects. Specifically, the area effect icons 55 have three colors, i.e., "blue", "green", and "violet". The area effect icons 55 also have different shapes (different icon images). The shapes (icon images) of the area effect icons 55 indicate the specific effects that are present in virtual areas. The colors of the area effect icons 55 indicate which of the virtual areas and which of the groups the "specific effects" are present.

The "blue" area effect icon 55 indicates that a specific effect is present only in a virtual area to which the icon is given, and the specific effect affects the users of all the groups participating in the virtual area.

The "green" area effect icon 55 indicates that a specific effect is present in a virtual area to which the icon is given, and a virtual area(s) adjacent to the virtual area to which the icon is given. Specifically, the "green" area effect icon 55 indicates that the same specific effect is present in a virtual area to which the green icon is given, and a virtual area(s) adjacent to the virtual area to which the icon is given, for a group holding the virtual area to which the icon is given.

The "violet" area effect icon 55 indicates that a virtual area to which the icon is given has the same specific effect that is present in an adjacent virtual area to which the "green" area effect icon 55 is given (such an effect is a spillover effect).

Figure 12:
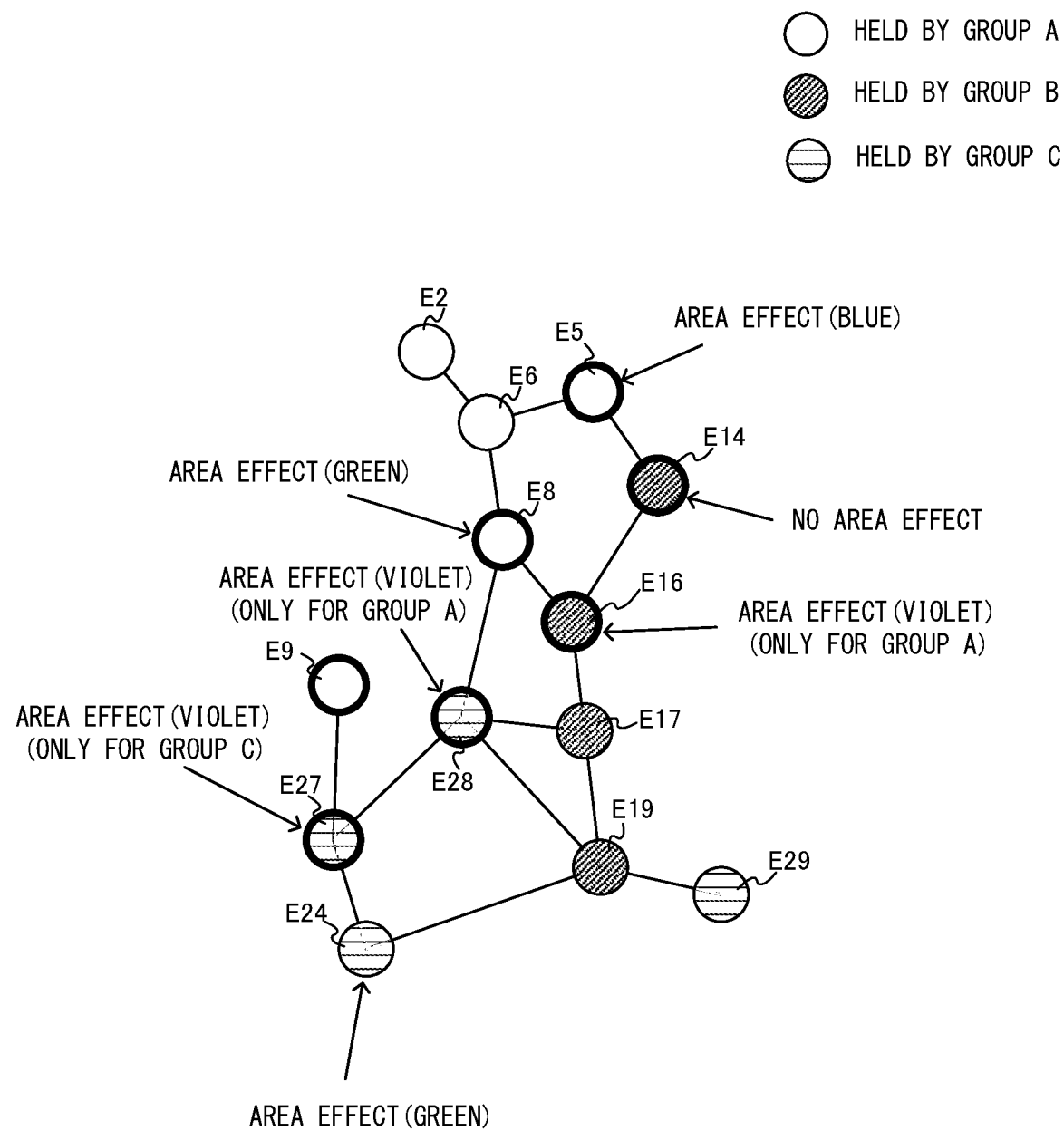
FIG. 12 is an example non-limiting diagram showing ranges that are affected by specific effects indicated by area effect icons 55.

FIG. 12 is an example non-limiting diagram showing ranges that are affected by the specific effects indicated by the area effect icons 55. FIG. 12 shows a portion of the virtual areas displayed on the user terminals 3 of the group A, where the outer edges of virtual areas that can be designated by the users of the group A are indicated by a thick solid line as in FIG. 10.

As shown in FIG. 12, for example, it is assumed that a "blue" area effect icon 55 is given to the virtual area E5. In this case, in the virtual area E5, a specific effect corresponding to the shape of the area effect icon 55 affects the users of all the groups. For example, although the virtual area E5 is held by the group A, the specific effect indicated by the "blue" area effect icon 55 affects not only the users of the group A but also the users of the groups B and C. In the user terminals 3 of the users of all the groups A-C, the area selection screen of the virtual area E5 will display the "blue" area effect icon 55.

For example, it is assumed that a "green" area effect icon 55 is given to the virtual area E8 held by the group A. In this case, in the virtual area E8, the users of the group A are affected by a specific effect. In the user terminals 3 of the users of all the groups A-C, the area selection screen of the virtual area E8 will display the "green" area effect icon 55.

The same specific effect that is present in the virtual area E8 is also present in the virtual area E16, which is adjacent to the virtual area E8. In other words, in the virtual area E16, the users of the group A are affected by the same specific effect that is present in the virtual area E8. The spillover specific effect of the virtual area E8 is present in the virtual area E16, and therefore, the virtual area E16 is given a "violet" area effect icon 55. Specifically, when a user of the group A selects the virtual area E16, the area selection screen (c-2) of FIG. 9 displays the "violet" area effect icon 55. In addition, the same specific effect that is present in the virtual area E8 is present in the virtual area E28, which is adjacent to the virtual area E8. Therefore, when a user of the group A selects the virtual area E28, the area selection screen (c-2) displays the "violet" area effect icon 55.

Although the virtual area E6 is also adjacent to the virtual area E8, which is given the "green" area effect icon 55, the virtual area E6 cannot be designated by the users, and therefore, even when a user selects the virtual area E6, the area selection screen is not displayed, and a "violet" area effect icon 55 is not displayed.

When the virtual area E24, which is held by the group C, is given a "green" area effect icon 55, the spillover specific effect of the virtual area E24 affects the users of the group C in the virtual area E27, which is adjacent to the virtual area E24. The spillover specific effect of the virtual area E24 does not affect any user other than the users of the group C. In this case, even when a user not belonging to the group C selects the virtual area E27, the area selection screen does not display a "violet" area effect icon 55. For example, even when a user of the group A selects the virtual area E27, the area selection screen does not display a "violet" area effect icon 55. Meanwhile, in the user terminal 3 of a user of the group C, when the user selects the virtual area E27, the area selection screen displays a "violet" area effect icon 55.

The specific effects that are present in virtual areas will now be described. In this embodiment, there are a plurality of specific effects.

FIG. 13 is an example non-limiting diagram showing example non-limiting specific effects that are present in virtual areas. For example, the specific effects are "Effect 1" to "Effect 3". "Effect 1" is to enhance the offensive power of a character of Type 1. In this embodiment, there are a plurality of types of characters for use in the fighting game. The characters of different types have different features. For example, characters of Type 1 have a feature that the offensive power is weak and the agility is high. Characters of Type 2 have a feature that the offensive power is strong and the agility is low. Characters of Type 3 have a feature that the character can use a finishing move once per several attacks, and in the finishing move, the character attacks an enemy character using high offensive power. "Effect 2" is to improve the agility of a character of Type 2. "Effect 3" is to increase the frequency of a finishing move of a character of Type 3.

Each user plays the fighting game using a plurality of characters. The user can select the type of a character for use in the fighting game. For example, the area selection screen (c-1) of FIG. 9 or the entire screen (a) of FIG. 9 can display a screen for selecting a plurality of characters for use in the fighting game, and allow the user to select a plurality of characters. When the user plays the fighting game in a virtual area in which a specific effect (e.g., "Effect 1") is present, the user can select the types of a plurality of characters such that the specific effect present in the virtual area is advantageous to the user themselves. In other words, the user can have an advantage in the fighting game by appropriately selecting a combination of characters for use in the fighting game, taking into account which of the effects is present in which of the virtual areas. In addition, by selecting a well-balanced combination of characters, the user can avoid an extreme disadvantage no matter what kind of enemy appears in the fighting game. Thus, the user plays the fighting game while strategically selecting a virtual area for the fighting game, taking into account a specific effect present in the virtual area and the type of a user character of the user.

Referring back to FIG. 9, for example, when an icon (not shown) for issuing an instruction to start the fighting game is selected on the area selection screen (c-1) of FIG. 9, the fighting game starts in a virtual area (the virtual area E8 in the example of FIG. 9) specified by the user. At the start of the fighting game, a fighting game screen (d) of FIG. 9 is displayed.

The fighting game screen (d) of FIG. 9 displays user characters 100-102 and enemy characters 200-202. In the fighting game, the characters fight against each other according to the user's operation. For example, the user moves the user character 101, and causes the user character 101 to attack. The enemy characters 200-202 are automatically controlled by the processor 31 of the user terminal 3. When a specific effect is present in a virtual area specified by the user, the abilities of the user characters 100-102 are improved, depending on the types of the user characters 100-102. In such a case, the user has an advantage in the fighting game.

If the user has won the fighting game, an obtained score screen (e) of FIG. 9 is displayed. The obtained score screen (e) displays a score value obtained by the user in the current fighting game. Here, a score value SC that is obtained by the user when the user wins the fighting game is calculated based on the result of the fighting game. Specifically, the score value SC is calculated by:

the obtained score value $SC$=a value corresponding to the result of the fighting game×a multiplying factor corresponding to the physical strength value       (1)

As used herein, the term "value corresponding to the result of the fighting game" refers to a value varying depending on the result of the fighting game, such as the number of enemy characters that have been defeated in the fighting game or the number of remaining user characters. As used herein, the term "multiplying factor corresponding to the physical strength value" refers to a value varying depending on the physical strength value specified (consumed) by the user on the area selection screen. For example, the multiplying factor corresponding to the physical strength value may be the same as the consumed physical strength value.

The result of the fighting game performed in the user terminal 3 is sent to the server 2. The server 2 adds an area additional value SCa corresponding to the obtained score value SC to the area score of the group to which the user belongs, in the virtual area E8, in which the user has played the fighting game. Specifically, the server 2 adds, to the area score of the group A in the virtual area E8, the value SCa, which is calculated by:

the area additional value $SCa$=the obtained score value $SC$×(1+the number of participating users of the group to which the user belongs×0.1)       (2)

Here, the term "number of participating users of the group to which the user belongs" refers to the number of users of the group to which the user belongs who are participating in the virtual area.

For example, it is assumed that the number of users participating in the virtual area E8 is "5 users", and the users belonging to the group A has designated the virtual area E8 and has played the fighting game, and as a result, has obtained a score value of "100". In this case, "150" is added to the area score of the group A in the virtual area E8.

It should be noted that an upper limit is set for the multiplying factor corresponding to the number of participating users of the group to which the user belongs (the number of participating users of the group to which the user belongs×0.1), and for example, the upper limit of the multiplying factor is "2". Specifically, when the number of users of the group to which the user belongs who are participating in a virtual area is less than 20, the multiplying factor corresponding to the number of participating users of the group to which the user belongs is increased. When the number of users of the group to which the user belongs who are participating in a virtual area is 20 or more, the multiplying factor is constant. When the number of participating users of the group to which the user belongs is one, the multiplying factor corresponding to the number of participating users of the group to which the user belongs is set to "0".

After the displaying of the obtained score screen (e) of FIG. 9 is ended, the entire screen (a) of FIG. 9 is displayed again. If the physical strength value (a value indicated by the physical strength display 52) of the user is more than "0", the user can continue to play the fighting game. If the physical strength value is "0", the user can no longer play the fighting game. It should be noted that the physical strength value recovers after a predetermined period of time (e.g., 1 hour) has passed, or by the use of a recovery item.

After specifying a virtual area and playing the fighting game, the user can designate one different from the previous virtual area and play the fighting game in the same round. In other words, the user can play the fighting game a plurality of times, and can play the fighting game in different virtual areas, in a single round, if the physical strength value is not zero. For example, after designating the virtual area E8 and playing the fighting game in a round, the user a1 can designate the virtual area E16 and play the fighting game before the end of the round. In this case, the user a1 is considered to participate in the virtual area E8 and the virtual area E16 in the round. Thus, the user a1 is counted in the number of users participating in the virtual area E8 and the number of users participating in the virtual area E16.

Here, "classes" are set for users. A value corresponding to the class of a user is added to a score in a virtual area that is adjacent to a virtual area in which the user has played the fighting game.

FIG. 14 is an example non-limiting diagram showing an example non-limiting relationship between the user classes and proportions of a score added to an adjacent virtual area. As shown in FIG. 14, a value obtained by multiplying the obtained score value SC by a proportion corresponding to the class of a user is added to the group to which the user belongs in an adjacent virtual area (adjacent area). Specifically, the score added to an adjacent area is calculated by:

the adjacent area additional value $SCb$=the obtained score value $SC$×an addition proportion corresponding to the class×(1+the number of participating users of the group to which the user belongs×0.1)    (3)

Here, the "obtained score value SC" is calculated by Expression (1). The "addition proportion corresponding to the class" is shown in FIG. 14. The "number of participating users of the group to which the user belongs" is the number of users of the group to which the user belongs who are participating in the adjacent area.

For example, it is assumed that a user belonging to the group A has participated in the virtual area E8 and has won the fighting game. In this case, if the class of the user is "1", no score is added to an adjacent area. For example, if the class of the user is "2" and the number of users participating in an adjacent area is "5", "the obtained score value SC×10%×1.5" is added to the group A in the adjacent area (e.g., the virtual area E16). If the class of the user is "3" and the number of users participating in an adjacent area is "5", "the obtained score value SC×20%×1.5" is added to the group A in the adjacent area. The adjacent area additional value SCb corresponding to the class that is calculated by Expression (3) is also added to other virtual areas (virtual areas E28, E6, and E7) adjacent to the virtual area E8.

The class of each user is initially set to "1", and is increased with an increase in the sum of the obtained score values SC obtained by the user in the fighting game. Once the class of a user is increased, the class of the user is never decreased until the end of the third match in the multiplayer game. In other words, the obtained score values SC are accumulated from the start of the first match until the end of the third match in the multiplayer game. The class of the user is set based on the sum of the obtained score values SC accumulated.

As can be seen from the foregoing, when a user of a certain group (e.g., the group A) has designated a certain virtual area X and has played the fighting game, the area additional value SCa is calculated based on Expression (2) at that time, and is added to the area score of the group A in the virtual area X. When a user of the group A has played the fighting game in a virtual area adjacent to the virtual area X, the adjacent area additional value SCb is calculated based on Expression (3) at that time, and is added to the area score of the group A in the virtual area X. The "area additional value SCa" is calculated based on the obtained score value SC corresponding to the result of the fighting game and the number of users of the group A participating in the virtual area X at the time of the fighting game (e.g., at the start or end of the fighting game). The "adjacent area additional value SCb" is also calculated based on the obtained score value SC corresponding to the result of the fighting game and the number of users of the group A participating in the virtual area X at the time of the fighting game (e.g., at the start or end of the fighting game). Thus, both the area additional value SCa and the adjacent area additional value SCb vary depending on the number of users of the group A participating in the virtual area X at the time of the fighting game. In this embodiment, the fighting game is played a plurality of times in the virtual area X and adjacent areas for a predetermined period of time. Each time the fighting game is played, the area additional value SCa and the adjacent area additional value SCb are calculated and added to the area score of the group A in the virtual area X. In other words, the area score of the group A in the virtual area X is a cumulative score corresponding to the results of the fighting game played in the virtual area X and adjacent areas for a predetermined period of time.

As described above, in this embodiment, a game is played in which a plurality of groups compete against each other to acquire virtual areas. In each user terminal 3, the fighting game is played according to the user's operation, and the score value SC corresponding to the result of the fighting game is calculated. The result of the fighting game played in each user terminal 3 is sent to the server 2. When receiving the results of the fighting games from the user terminals 3, the server 2 adds the score values SC corresponding to the results of the fighting game to the area score value of the group to which the users of the user terminals 3 belong. The server 2 determines to which of the groups each virtual area belongs, based on the area score values, every predetermined period of time (holding determination). When the server 2 has performed the holding determination, the server 2 stores the virtual areas in association with the groups determined by the holding determination. The server 2 performs the holding determination and the storage of the determination result every predetermined period of time, a plurality of times, and determines the winner or loser of the groups in the multiplayer game, according to how many virtual areas are held by each group.

(Details of Process of Multiplayer Game)

Next, processes performed in the user terminal 3 and the server 2 will be described in greater details. Firstly, data stored in the user terminal 3 and the server 2 will be described.

FIG. 15 is an example non-limiting diagram showing example non-limiting data stored in the user terminal 3. As shown in FIG. 15, the user terminal 3 stores a game program, a user ID, character data, group data, area data, class data, and physical strength data. It should be noted that, in addition to the data of FIG. 15, the user terminal 3 may store various other pieces of data.

The game program is for performing a terminal process (described below) that is executed in the user terminal 3, including a program for performing the fighting game, a program for communicating with the server 2, etc.

The user ID is identification information uniquely assigned to the user of the user terminal 3. For example, when the user accesses the server 2 to perform user registration, the server 2 issues a user ID, which is then stored in the user terminal 3 and the server 2.

The character data is related to a user character. For example, the character data contains an image, type, characteristic value, etc., of the user character. The group data indicates to which of the groups A-C the user belongs. The area data indicates a virtual area specified by the user. The class data indicates the current class of the user. The physical strength data indicates the current physical strength value of the user. The character data, group data, area data, class data, and physical strength data are stored in the server 2. The user terminal 3 accesses the server 2 to obtain these pieces of data from the server 2 at the start of or during the game of this embodiment.

FIG. 16 is an example non-limiting diagram showing example non-limiting data stored in the memory 26 of the server 2. As shown in FIG. 16, the server 2 stores a server program, user data, and area data.

The server program is for controlling the multiplayer game of this embodiment, and executing a server process (described below) that is performed in the server 2.

The user data is related to each user. FIG. 17 is an example non-limiting diagram showing example non-limiting user data stored in the server 2. As shown in FIG. 17, the server 2 stores, as the user data, information about user characters, physical strength values, the class of each user, information about a group to which each user belongs, information about virtual areas in which users are participating in the current round, and score values. These pieces of information are stored in association with user IDs.

The area data is related to virtual areas. FIG. 18 is an example non-limiting diagram showing example non-limiting area data stored in the server 2. As shown in FIG. 18, the server 2 stores area IDs for identifying virtual areas in association with "holding groups", "adjacent areas", "area effects", "area scores", "number of participating users", and "KO flags".

The "holding group" is information indicating which of the groups currently holds the virtual area, i.e., to which of the groups the virtual area belongs. The value of the "holding group" is changed each time the holding determination is performed (every round). In addition, if it has been determined that knockout has occurred in the middle of a round, the value of the "holding group" is changed even in the middle of the round.

The "adjacent area" is information indicating a virtual area adjacent to the virtual area. In this embodiment, it is assumed that the value of the "adjacent area" is a predetermined invariable value. It should be noted that the value of the "adjacent area" may be changed as the game proceeds.

The "area effect" is information about an area effect icon 55, including the type of an effect present in the virtual area, and information (the color of an area effect icon) about a group that is affected by the effect. In this embodiment, a virtual area(s) having an area effect is previously determined. It should be noted that, in a virtual area given a "green" area effect icon (the virtual area E8 in FIG. 18), a group that is affected by the area effect is changed according to the "holding group" of the virtual area. In a virtual area given a "violet" area effect icon (the virtual area E16 in FIG. 18), a group that is affected by the area effect is changed according to the "holding group" of the virtual area E8, which is adjacent to that virtual area. It should be noted that virtual areas in which an area effect is present may be changed as the game proceeds. Specifically, virtual areas given a "blue" or "green" area effect icon 55 may be changed as the game proceeds.

As shown in FIG. 18, the server 2 also stores an "area score" for each group. It should be noted that, in FIG. 18, in the virtual areas E1 and E2, the fighting game has not been played, and therefore, no area score is stored. In the virtual area E8, the users of the groups A-C are participating, and therefore, an area score is stored for each of the groups A-C. In the virtual area E16, the users of the groups A and B are participating, and therefore, an area score is stored for each of the groups A and B.

The server 2 also stores the "number of participating users" of each group for each virtual area. When a user of a group participates in a virtual area, the "number of participating users" is incremented.

The server 2 also stores a KO flag indicating whether or not knockout has occurred in each virtual area in the current round. As shown in FIG. 18, in the virtual area E8, the difference in area score between the first-ranked and second-ranked groups is less than "100,000", and therefore, knockout has not occurred. Therefore, "OFF" is stored as the KO flag. Meanwhile, in the virtual area E16, the difference in area score between the first-ranked and second-ranked groups is "100,000" or more, and it is determined that knockout has occurred, and therefore, "ON" is stored as the KO flag. At the time that it has just been determined that knockout has occurred in the middle of a round, the "holding group" of the virtual area is rewritten. Here, in the virtual area E16, the group B has achieved knockout, "B" is stored in the "holding group". Once the KO flag has been set to "ON", no users can play the fighting game in the virtual area until the KO flag is reset to "OFF" at the start of the next round.

(Details of Terminal Process in User Terminal 3)

Next, an example non-limiting terminal process performed in the user terminal 3 will be specifically described.

Figure 19:
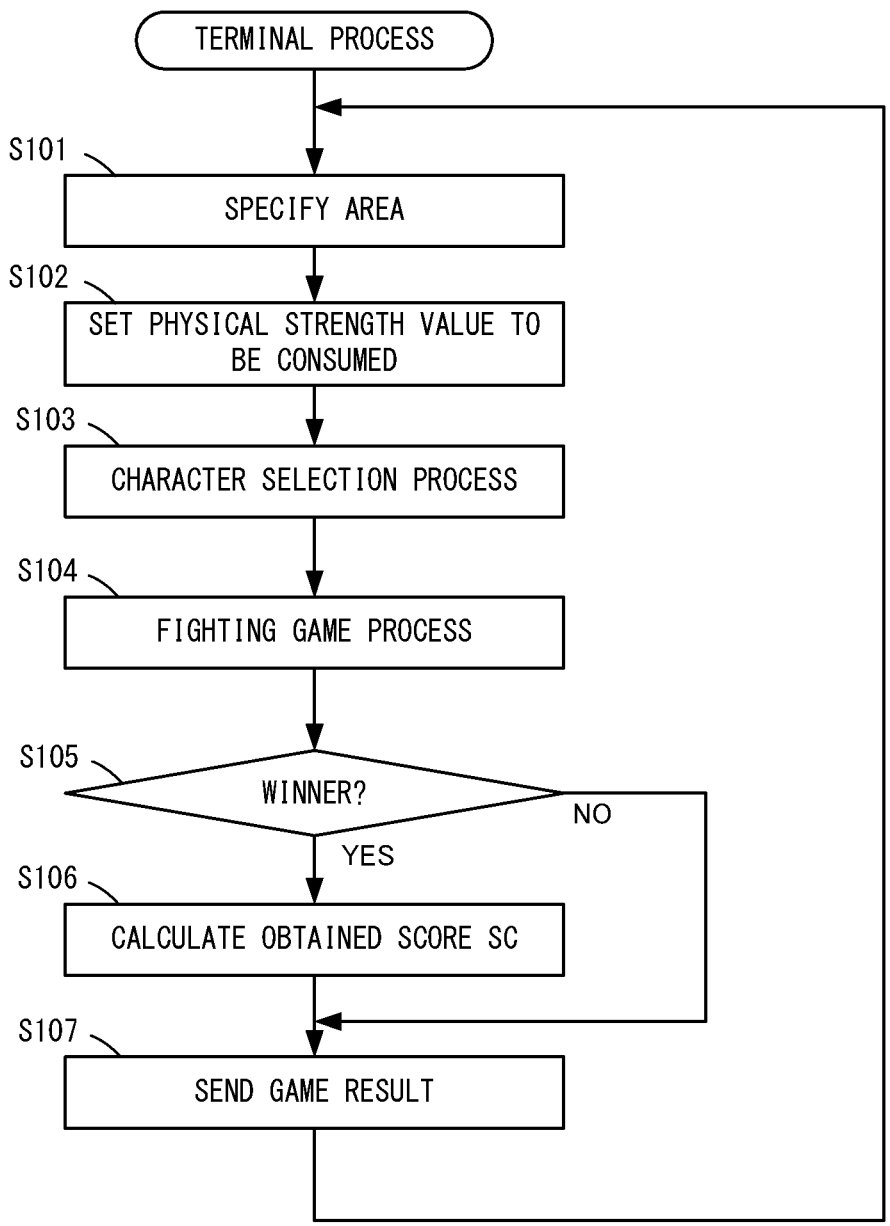
FIG. 19 is an example non-limiting flowchart showing an example non-limiting terminal process performed in the user terminal 3.

FIG. 19 is an example non-limiting flowchart showing an example non-limiting terminal process performed in the user terminal 3. The process of FIG. 19 is executed by the processor 31 of the user terminal 3 executing a game program. It should be noted that the process of FIG. 19 is started by the user of the user terminal 3 issuing an instruction to execute the multiplayer game of this embodiment. At the start of the process of FIG. 19, information about the location of each virtual area, a group holding each virtual area, etc., is obtained from the server 2, and the entire screen (a) of FIG. 9 showing the virtual space is displayed on the display unit 35. The user terminal 3 also communicates with the server 2 at appropriate timings to exchange data during the execution of the process of FIG. 19.

As shown in FIG. 19, the user terminal 3 specifies a virtual area according to the user's instruction (step S101). For example, the user terminal 3 determines a virtual area specified by the user, based on the position of a touch detected by the touch panel 34. The user terminal 3 sends the area ID of the virtual area specified by the user to the server 2. Based on the area ID from the user terminal 3, the server 2 sends information about the virtual area corresponding to the area ID (e.g., the number of currently participating users of each group, the area score of each group, and an area effect) to the user terminal 3. Thereafter, the user terminal 3 displays, for example, the area selection screen (c-1) of FIG. 9, based on the information about the virtual area received from the server 2. It should be noted that, as described above, a virtual area that can be specified by a user as an area where the fighting game is to be played, is one that is held by the group of the user and is adjacent to a virtual area of an opponent group, or one that is held by an opponent group and is adjacent to a virtual area held by the group of the user. No user can designate a virtual area in which it has been determined knockout has occurred in the current round.

Next, the user terminal 3 sets the physical strength value that is to be consumed (step S102). The physical strength value to be consumed is specified by the user.

Next, the user terminal 3 performs a character selection process (step S103). Specifically, if the user has issued an instruction to select a user character that is to be used in the fighting game, the user terminal 3 displays a selection screen for allowing the user to select a character. If a character has been selected on the selection screen, then the user terminal 3 executes step S104. If the user has not issued an instruction to select a user character, the user terminal 3 executes step S104 without performing the character selection process.

Following step S103, the user terminal 3 executes a fighting game process according to the user's instruction (step S104). Specifically, if the user has issued an instruction to start the fighting game, the user terminal 3 sends, to the server 2, the area ID of the virtual area specified by the user in step S101 and the user ID. The server 2, which stores area IDs and user IDs in association with each other as shown in, for example, FIG. 17, causes the user corresponding to the user ID to participate in the virtual area corresponding to the area ID. The server 2 also increments the number of participating users of the group to which the user belongs in the specified virtual area. Thereafter, the user terminal 3 starts the fighting game. At the start of the fighting game, the user terminal 3 displays the fighting game screen (d) of FIG. 9. While the screen (d) of FIG. 9 is being displayed, the user terminal 3 receives the user's operation, and performs the fighting game process according to the user's operation.

In the fighting game process of step S104, if an area effect is present in the virtual area, the user has an advantage. For example, if the user character that plays the fighting game is of Type 3, then when "Effect 3" of FIG. 13 is present in the virtual area, the user can have an advantage in playing the fighting game.

After the end of the fighting game process of step S104, the user terminal 3 determines whether or not the user has won the fighting game (step S105). If the user has won the fighting game (step S105: YES), the user terminal 3 calculates the obtained score value SC obtained by the user in the current fighting game (step S106). Specifically, the user terminal 3 calculates the obtained score value SC based on the result of the fighting game and the physical strength value specified in step S102. More specifically, the user terminal 3 calculates the obtained score value SC according to Expression (1). It should be noted that the calculation of the obtained score value SC in step S106 may be performed by the server 2.

If step S106 has been executed or the determination result of step S105 is negative ("NO"), the user terminal 3 sends the result of the fighting game to the server 2 (step S107). Specifically, if the user has won the fighting game, the user terminal 3 sends, to the server 2, information indicating that the user has won, the obtained score value SC calculated in step S106, and the consumed physical strength value. If the user has lost the fighting game, the user terminal 3 sends, to the server 2, information indicating that the user has lost, and the consumed physical strength value. As a result, the server 2 stores the obtained score value SC of the individual user, and adds a value corresponding to the obtained score value SC to the area score of the virtual area. In the server 2, the area additional value SCa is calculated according to Expression (2), and is added to the area score of the group in the virtual area.

After step S107, the user terminal 3 performs step S101 again.

(Details of Server Process in Server 2)

Figure 20:
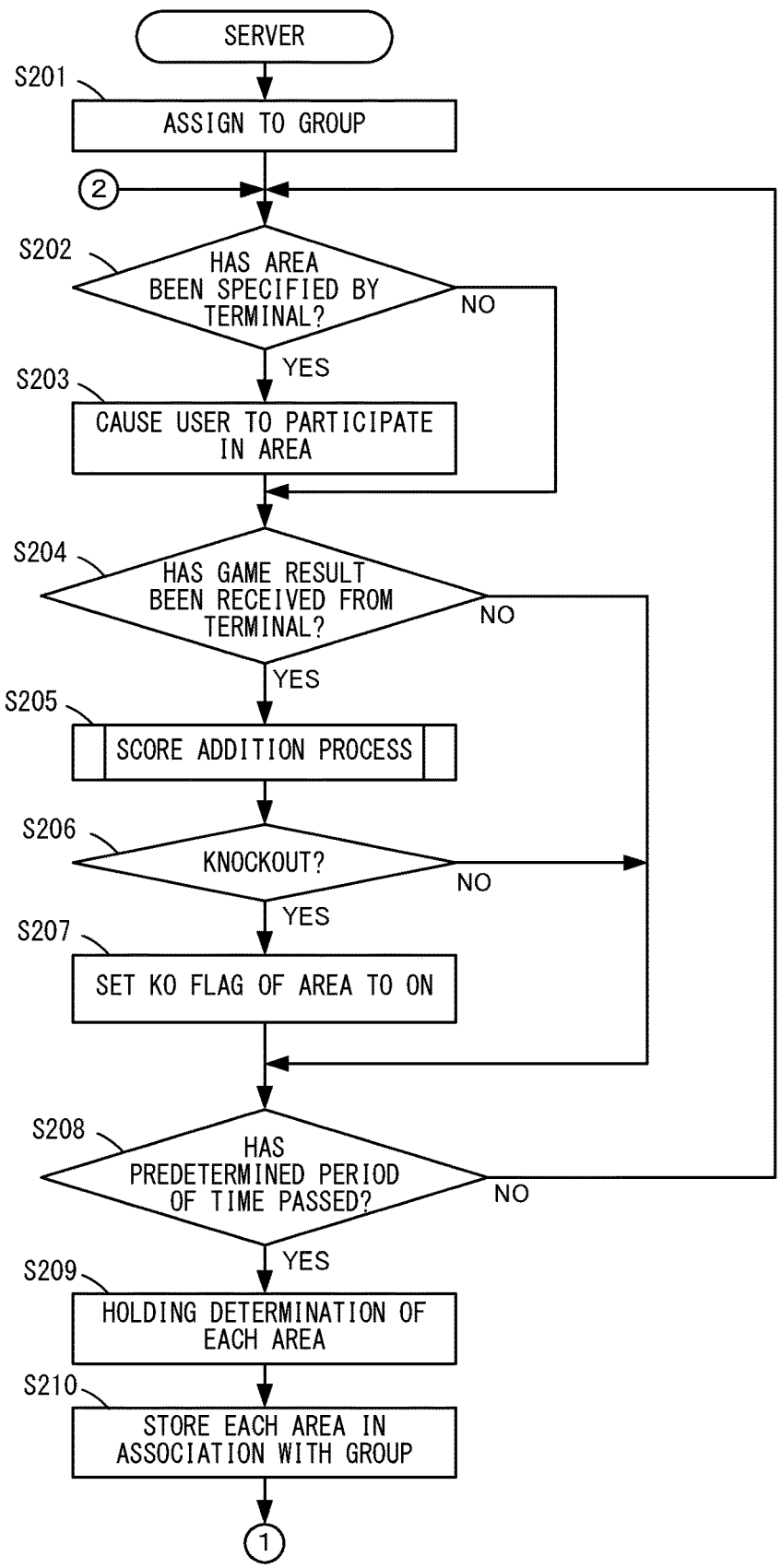
FIG. 20 is an example non-limiting flowchart showing an example non-limiting server process that is performed in the server 2.
Figure 21:
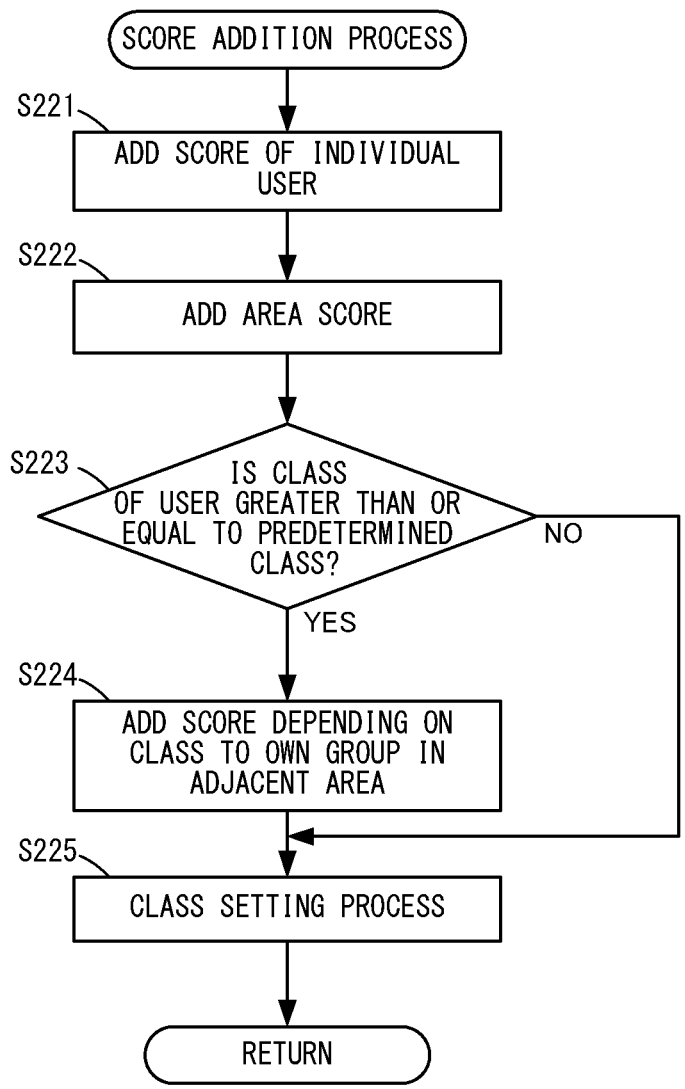
FIG. 21 is an example non-limiting flowchart showing details of a score addition process of step S205 of FIG. 20.

Next, an example non-limiting server process that is performed in the server 2 will be specifically described. FIG. 20 is an example non-limiting flowchart showing an example non-limiting server process that is performed in the server 2. FIG. 21 is an example non-limiting flowchart showing details of a score addition process of step S205 of FIG. 20. FIG. 22 is an example non-limiting flowchart showing an example non-limiting process following step S210 of FIG. 20. The processes of FIGS. 20 and 21 are performed by a CPU of the server 2 executing a server program. It should be noted that, in addition to the processes of FIGS. 20 and 21, the server 2 communicates with the user terminals 3 at appropriate timings to exchange various pieces of data.

The server 2 initially assigns users to groups based on applications for participating in the multiplayer game from the user terminals 3 (step S201). The server 2 may assign users to groups randomly or based on the records of past games of the users, the levels of the users, the levels of characters possessed by the users, etc.

Next, the server 2 determines whether or not a virtual area has been specified by a user terminal 3 (step S202). If a user has specified a virtual area in step S101 of FIG. 19, and the fighting game has been started in step S104, the result of the determination by the server 2 in step S202 is positive ("YES").

If the determination result of step S202 is positive ("YES"), the server 2 causes the user to participate in the virtual area (step S203). Specifically, the server 2 obtains the area ID of the virtual area specified by the user, and the user ID of the user, from the user terminal 3. Thereafter, the server 2 stores the area ID and the user ID in association with each other, and increments the number of participating users of the group to which the user belongs in the specified virtual area. Thus, the server 2 updates the pieces of data of FIGS. 17 and 18.

If step S203 has been executed, or the determination result of step S202 is negative ("NO"), the server 2 determines whether or not the server 2 has received the result of the fighting game from the user terminal 3 (step S204).

If the determination result of step S204 is positive ("YES"), the server 2 executes the score addition process (step S205). The score addition process of step S205 will now be described in detail with reference to FIG. 21.

As shown in FIG. 21, the server 2 adds the score value of the individual user, based on the result of the fighting game from the user terminal 3 (step S221). Specifically, the server 2 adds the obtained score value SC corresponding to the result of the current fighting game to the sum of score values obtained by the user in the virtual area. As a result, as shown in FIG. 17, the server 2 stores the score of each participating individual user for each virtual area.

Next, the server 2 adds a value to an area score (step S222). Specifically, the server 2 calculates the area additional value SCa (Expression (2)) based on the obtained score value SC and the number of participating users of the group to which the user belongs in the virtual area, and adds the calculated area additional value SCa to the area score of the group to which the user belongs. By performing step S222, the area score of the area data of FIG. 18 is updated.

Next, the server 2 determines whether or not the class of the user is higher than or equal to a predetermined class (step S223). If the determination result of step S223 is positive ("YES"), the server 2 adds a score depending on the class of the user to the group of the user in an adjacent area (step S224). Specifically, the server 2 adds the adjacent area additional value SCb calculated according to Expression (3) to the group of the user in a virtual area that is adjacent to the virtual area where the user has played the fighting game. If there are a plurality of virtual areas that are adjacent to the virtual area where the user has played the fighting game, the server 2 calculates the adjacent area additional value SCb for each adjacent area, and adds the calculated value to the area score of the group to which the user belongs in the adjacent area. By performing step S224, the area score of an adjacent area in the area data of FIG. 18 is updated.

If step S224 has been performed, or the determination result of step S223 is negative ("NO"), the server 2 performs a class setting process (step S225). The server 2 stores the sum of the obtained score values SC of the user that have been obtained since the start of the multiplayer game, and sets the class of the user based on the sum of the obtained score values SC. If step S225 has been performed, the server 2 ends the process of FIG. 21.

Referring back to FIG. 20, following step S205, the server 2 determines whether or not knockout has occurred in the virtual area (step S206). Here, for each virtual area in which the area score has been increased in step S205, it is determined whether or not knockout has occurred. Specifically, the server 2 determines whether or not the difference in area score between the first-ranked group having the highest area score and the second-ranked group having the second highest area score, the area scores being the results of the score addition process of step S205, is greater than or equal to a predetermined threshold.

If the determination result of step S206 is positive ("YES"), the server 2 sets a knockout for the virtual area in which it has been determined that knockout has occurred (step S207). Specifically, the server 2 sets the "KO flag" of the area data of FIG. 18 to ON for the virtual area in which it has been determined that knockout has occurred. The server 2 also sets the value of the "holding group" in the area data of FIG. 18 to the group that has knocked out (the first-ranked group in terms of area score) for the virtual area in which it has been determined that knockout has occurred. Thus, at the time that it has just been determined that knockout has occurred in a virtual area, the holding group of the virtual area is updated. Therefore, at the time that it has just been determined that knockout has occurred in a virtual area, if an area effect that can affect an adjacent area has been set in the virtual area, the spillover area effect affects a virtual area(s) adjacent to that virtual area. For example, in FIG. 18, before the execution of step S207, the holding group of the virtual area E8 is the "group A". If the holding group of the virtual area E8 is set to the "group B" by the execution of step S207, an area effect of the virtual area E8 starts to affect the virtual area E16, which is adjacent to the virtual area E8. Specifically, while Effect 1 affects the "group A" in the virtual area E16 before it has been determined that knockout has occurred, Effect 1 affects the "group B" in the virtual area E16 after it has been determined that knockout has occurred.

If step S207 has been executed, the determination result of step S204 is negative ("NO"), or the determination result of step S206 is negative ("NO"), the server 2 determines whether or not a predetermined period of time has passed since the start of the current round (step S208). If the determination result of step S208 is negative ("NO"), the server 2 executes step S202 again.

If the determination result of step S208 is positive ("YES"), the server 2 performs the holding determination for each virtual area (step S209). Here, the server 2 determines by which of the groups each virtual area has been seized, based on the area scores of the groups in the virtual area. Specifically, the server 2 determines which of the groups A-C has the highest area score for each virtual area, and determines the group having the highest area score has seized the virtual area.

Next, the server 2 stores a group that it has been determined has seized each virtual area, and the virtual area, in association with each other in a memory (step S210). In other words, the server 2 causes each virtual area to belong to a group having the highest area score in the virtual area. Specifically, the server 2 changes the value of the "holding group" in the area data of FIG. 18 to a group having the highest area score. As a result, in the next round, an area effect affects a different group.

If step S210 has been executed, then the server 2 executes step S211 of FIG. 22.

As shown in FIG. 22, in step S211, the server 2 determines whether or not the current round is the final round (step S211). If the determination result of step S211 is negative ("NO"), the server 2 causes the multiplayer game to proceed to the next round (step S212). If step S212 has been executed, the server 2 executes step S202 again.

If the determination result of step S211 is positive ("YES"), the server 2 determines the result of an N-th match (N=1–3), and outputs the result to the user terminals 3 (step S213). As a result, the user terminals 3 display the result of the N-th match of the multiplayer game. Next, the server 2 gives a prize to each user according to the result of the N-th match (step S214). For example, the server 2 gives a character, item, or game money to each user of a group that has won, and stores the prize as the user data of the user. The server 2 also sends information about the prize to each user terminal 3.

Next, the server 2 determines whether or not the third match has ended (step S215). If the determination result of step S215 is negative ("NO"), the server 2 causes the multiplayer game to proceed to the (N+1)-th match (step S216). If step S216 has been executed, the server 2 executes step S202 again.

If the determination result of step S215 is positive ("YES"), the server 2 ends the multiplayer game (step S217). The description of FIG. 22 is ended.

It should be noted that the processes shown in the flowcharts are merely illustrative. For example, the processes may be executed in a different order, or may be changed or modified as appropriate. Further, the values used in the processes and determinations may be changed.

As described above, in this embodiment, the user terminals 3 and the server 2 communicate with each other through a network, and execute a multiplayer game in which a plurality of groups including a plurality of users compete against each other to acquire virtual areas.

Each user is assigned to one of a plurality of groups, and specifies a virtual area and plays the fighting game in their own user terminal 3. In each user terminal 3, the fighting game is played a plurality of times, a predetermined period of time (e.g., 2 hours) for each time. The result of the fighting game played in each user terminal 3 is sent to the server 2, and scores corresponding to the results of the fighting games are accumulated for each group in the server 2. After the predetermined period of time has passed, it is determined by which of the groups each virtual area has been seized, based on the scores of the groups (which of the groups each virtual area is to be stored in association with). If the determination has been executed, the virtual areas and the groups are stored in association with each other in a memory. The determination performed every predetermined period of time and the storage into the memory are performed a plurality of times, before the results of the multiplayer game are output.

In this embodiment, it is thus determined every predetermined period of time by which of the groups each virtual area has been seized, and if the determination has been performed, the virtual areas and the groups are stored in association with each other in a memory. Therefore, the amusingness of the game in which the groups compete against each other to acquire virtual areas can be improved. Thus, groups holding virtual areas may change every predetermined period of time, and therefore, each user can play the game by selecting a virtual area in which the user is to participate, taking into account by which of the groups each virtual area is held. Therefore, the amusingness of the multiplayer game in which the groups compete against each other to acquire virtual areas can be improved. For example, when virtual areas held by an opponent group and virtual areas held by the user's group coexist in the virtual space, the determination of which of the virtual areas should be acquired affects whether or not the user's group will subsequently have an advantage over the opponent group. Therefore, each user selects a virtual area in which the user is to participate, in a strategic manner, resulting in an improvement in amusingness. The predetermined period of time may, for example, be set to several hours. In this case, users can participate in the game at a more convenient time, and more easily enjoy playing the multiplayer game. Therefore, a larger number of users can be caused to participate in the multiplayer game, and the amusingness of the multiplayer game can be maintained.

In this embodiment, a score that is added to the area score of a group to which a user belongs in a virtual area is changed, depending on the number of users of the group who are participating in the virtual area. Specifically, as the number of such participating users increases, the score that is added to the area score of the user's group in the virtual area is increased. Therefore, a group having a larger number of users participating in a virtual area is more likely to seize the virtual area.

The groups have substantially equal numbers of users assigned. If a larger number of users of a group are participating in a virtual area, in which the group has an advantage, a smaller number of users of the group are participating in another virtual area, in which the group has a disadvantage. In this embodiment, each user can check the number of users participating in a virtual area before participating in that virtual area. Therefore, each user can play the game while considering in which of the virtual areas the user should participate so that the user's group has an advantage, taking into account a current situation in each virtual area. Therefore, the amusingness can be improved. After a user has participated in a virtual area, the number of participating users in a group is updated in real time. Therefore, each user can select a virtual area to participate in, taking the changing situation of the game into account in real time. Therefore, the game in which user groups compete against each other to acquire virtual areas can be enjoyed in a more realistic manner.

In this embodiment, it is assumed that the holding determination is performed after a predetermined period of time has passed since the start of a round. In addition, even before the predetermined period of time has passed, if a predetermined condition (e.g., the difference in area score between the first-ranked and second-ranked groups is greater than or equal to a predetermined threshold) is satisfied, it is determined that knockout has occurred, and a virtual area is seized. Therefore, for example, when a group has an advantage over an opponent group to some extent in a virtual area, then if users of the group are intensively participating in the virtual area, the group can seize the virtual area early, and can attack another virtual area during the same predetermined period of time. In this embodiment, if it has been determined in a round that knockout has occurred in a virtual area, the fighting game is limited in the virtual area until the end of the round. Therefore, users can be prompted to knock out a virtual area early and participate in another virtual area, resulting in an improvement in amusingness.

In this embodiment, an area effect is set in a virtual area. Some area effects affect adjacent virtual areas. Therefore, by holding a specific virtual area, a user can have an advantage in playing the game in virtual areas surrounding the specific virtual area. Therefore, users can have increased options for seizing an important virtual area, which increases strategic aspects of the game. Furthermore, even before a predetermined period of time has passed, a virtual area can be seized (knocked out) if a predetermined condition is satisfied. Therefore, if an area effect that affects surrounding virtual areas has been set in such a virtual area, the area effect can affect surrounding virtual areas. Therefore, by intensively attacking a specific virtual area in a strategic manner, a user can have an advantage in the game.

In this embodiment, a score depending on the class of a user can be added to a virtual area adjacent to a virtual area in which the user is participating. Therefore, if a user participates in a specific virtual area, not only is a score added to the specific virtual area, but also a score is added to virtual areas surrounding the specific virtual area. Therefore, various options can be provided to the users as to how the users participate in which of the virtual areas, resulting in an improvement in the amusingness of the game. Furthermore, in this embodiment, even before a predetermined period of time has passed, a virtual area can be seized if a predetermined condition is satisfied, and therefore, a plurality of virtual areas can be seized before the predetermined period of time has passed. Therefore, for example, a group can quickly come back from a situation that the group is at a disadvantage.

In this embodiment, each user can participate in a virtual area that is held by an opponent group and is adjacent to a virtual area held by the user's group, or a virtual area that is held by the user's group and is adjacent to a virtual area held by an opponent group. As the number of virtual areas that are held by a group and are adjacent to a virtual area held by an opponent group decreases, the number of virtual areas in which users of the group can participate decreases, and the number of participating users of the group per virtual area increases proportionately. Conversely, as the number of virtual areas that are held by a group and are adjacent to a virtual area held by an opponent group increases, the number of virtual areas in which users of the group can participate increases, and the number of participating users of the group per virtual area decreases proportionately. Therefore, each user selects a virtual area to participate in, in a strategic manner, taking into account the locations of current virtual areas held by the user's group, resulting in an improvement in amusingness. As the front line of a group becomes longer, the group is at a greater disadvantage. Therefore, a situation that a specific group one-sidedly holds a large number of virtual areas can be prevented or reduced.

In this embodiment, a physical strength value that is to be consumed in the fighting game can be set by each user. When a user has won the fighting game, the obtained score value of the user can be increased according to the consumed physical strength value. As a result, a user can quickly add a greater score to the user's group. It should be noted that in the above embodiment, the obtained score value is calculated by multiplying a value corresponding to the result of the fighting game by a multiplying factor corresponding to the physical strength value. The multiplying factor corresponding to the physical strength value may be different from the consumed physical strength value. For example, a greater score may be obtained when the fighting game is performed only once by consuming a physical strength value of "3" than when the fighting game is performed three times by consuming a physical strength value of "1" for each time. In this case, each user is allowed to determine, in a strategic manner, whether or not to play the fighting game a plurality of times, or whether or not to reduce the number of times the fighting game is played and increase the score value to be obtained per round of the fighting game, resulting in an improvement in the amusingness of the game.

(Variations)

In the foregoing, the multiplayer game of this embodiment has been described. Changes or modifications can be made to the multiplayer game as described below.

For example, in the above embodiment, as the area score of each group in a virtual area, the cumulative value of the obtained score values that are obtained by the users of the group playing the fighting game for a predetermined period of time is calculated. It is assumed that a group having the highest area score of all the groups seizes the virtual area. In another embodiment, the area score may be calculated for a predetermined period of time using another method. For example, the highest one of those obtained by the users of a group as a result of playing the fighting game for a predetermined period of time, may be calculated as the area score of the group. In addition, it may be assumed that a group having the highest area score of all the groups may seize the virtual area.

In the above embodiment, the holding determination performed every predetermined period of time, and the storage into the memory, are repeatedly performed a predetermined number of times (e.g., 22 rounds), and thereafter, the result of the multiplayer game is output. In another embodiment, the timing at which the result of the multiplayer game is output is not limited to this. For example, when the sum of the area scores in all the virtual areas of each group has exceeded a predetermined value, the result of the multiplayer game may be output. Alternatively, when the number of times the fighting game has been played has reached a predetermined number of times, or a particular virtual area (e.g., a stronghold) of each group has been seized, the result of the multiplayer game may be output. Specifically, after the holding determination and the storage of the result of the holding determination into the memory have been repeatedly performed until an end condition (e.g., the 22 round has been ended, the sum of the area scores in all the virtual areas has exceeded a predetermined value, etc.) is satisfied, the result of the multiplayer game may be output.

In the above embodiment, the area additional value SCa (Expression (2)) to be added to the area score of a group is calculated by multiplying an obtained score value corresponding to the result of the fighting game by a multiplying factor corresponding to the number of users belonging to the group who are participating in a virtual area. In addition, when the fighting game has been played in a virtual area adjacent to a virtual area X, the adjacent area additional value SCb (Expression (3)) to be added to the area score of a group in the virtual area X is calculated by multiplying an obtained score value corresponding to the result of the fighting game in the adjacent area by an addition proportion corresponding to the class and a multiplying factor corresponding to the number of users of the group who are participating in the virtual area X. Thus, in the above embodiment, the area additional value SCa and the adjacent area additional value SCb are calculated based on the number of users of a group who are participating in a virtual area. The area additional value SCa and the adjacent area additional value SCb may be calculated based on user information about the users of a group who are participating in a virtual area, instead of the number of users of a group who are participating in a virtual area. Specifically, a value to be added to the area score of a group may be calculated based on the result of the fighting game and user information about the users of the group who are participating in a virtual area. For example, the "user information about the users of a group" may be the sum of the strengths or levels of the users of the group, information about a user who is a leader, information about a character of each user, etc.

In the above embodiment, when the fighting game has been played in a virtual area or an adjacent virtual area thereto, the area additional value SCa and the adjacent area additional value SCb are calculated based on the number of uses of a group who are participating in the virtual area at the time of playing the fighting game. In another embodiment, the timing at which the number of participating users (information about users) is determined is not limited to the timing of playing the fighting game, and may be other timings. For example, the timing at which the number of participating users (information about users) is determined may be a timing at which a predetermined period of time ends.

Expressions (1)-(3) are merely illustrative. The scores may be calculated using other calculation formulas.

In the above embodiment, the condition under which it is determined that knockout has occurred is that the difference in area score between the first-ranked and second-ranked groups is greater than or equal to a predetermined threshold. The predetermined condition related to knockout is not limited to this, and may be other conditions. For example, the predetermined condition related to knockout may be that the area score of any one of the groups is greater than or equal to a predetermined value.

In the above embodiment, if it has been determined that knockout has occurred in a virtual area, the execution of the fighting game is limited until the end of the current round. In another embodiment, for example, if it has been determined that knockout has occurred in a virtual area, the execution of the fighting game may be limited in all the virtual areas until the end of the current round. Alternatively, if it has been determined that knockout has occurred in a virtual area, the execution of the fighting game is limited in that virtual area and virtual areas related thereto until the end of the current round.

In the above embodiment, it is assumed that an area effect that is present in a virtual area affects a virtual area adjacent to that virtual area. In another embodiment, an area effect that is present in a virtual area may affect not only a virtual area adjacent to that virtual area, but also other virtual areas related to that virtual area. In the above embodiment, a score depending on the class of a user (a parameter related to the user) is also added to an adjacent virtual area. In another embodiment, a score depending on the class of a user may be added to not only a virtual area adjacent to that virtual area, but also other virtual areas related to that virtual area. Other virtual areas related to that virtual area may be a virtual area adjacent to that virtual area, or a virtual area located further away from (i.e., not adjacent to) that virtual area.

In the above embodiment, it is assumed that a physical strength value to be consumed is specified by a user before the start of playing the fighting game. Alternatively, the physical strength value may be specified by a user after the end of or during the execution of the fighting game. In the above embodiment, it is also assumed that the obtained score value can be increased by the user consuming the physical strength value. Alternatively, if a user has a predetermined item, the obtained score value may be increased using the item (without consuming the item). Specifically, a predetermined game parameter (the physical strength value or item) may be related to a user, and the obtained score value may be changed, depending on an amount using the game parameter, or whether or not the game parameter is used.

Each of the above processes may be performed by either the server 2 or the user terminal 3. For example, a portion of the processes performed in the server 2 may be performed in the user terminal 3. A portion of the processes in the user terminal 3 may be performed in the server 2.

For example, the game process involved in the fighting game in the user terminal 3 may be executed in the server 2. The calculation of the obtained score value based on the result of the fighting game may be performed in the server 2.

In the foregoing, this embodiment has been described. The foregoing description of this embodiment is merely illustrative, and various changes and modification can be made thereto.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system including a plurality of terminals configured to be operated by respective users each belonging to one of a plurality of groups, and for controlling progression of a game comprising a plurality of periods of time in which at least two of the plurality of groups compete against each other to acquire at least one virtual area, the information processing system including at least one processor and a memory, wherein the information processing system performs:
    executing a game process involved in a game related to a virtual area, based on operations of the users performed in at least a subset of the plurality of terminals, respectively;
    updating area information about the virtual area for each group, based on the progression of the game and a result of the game process executed based on the operations of the users in the at least a subset of the plurality of terminals, respectively;
    determining, as the game progresses, for each of the plurality of periods of time, whether a group maintains hold of the virtual area or another group acquires the virtual area based on the updated area information for each group;
    updating a stored association of a group and the virtual area in the memory, based on the determination for each of the plurality of periods of time, the stored association indicating a holder of the virtual area, where the game process is executed using the stored association; and
    outputting a result of the game in which the plurality of groups compete against each other to acquire the at least one virtual area after repeatedly performing the determining and the updating the stored association until an end condition related with the game is satisfied,
    wherein the information processing system outputs the result of the game in which the plurality of groups compete against each other to acquire the at least one virtual area after performing the determining and the updating a predetermined number of times.

2. The information processing system according to claim 1, wherein
    the information processing system updates, as the area information, a score related to the virtual area for each group, based on the progression of the game and the result of the game process, and
    determines which of the plurality of groups the virtual area is to be stored in association with, based on the score, for each of the plurality of periods time.

3. The information processing system according to claim 2, wherein the information processing system cumulatively adds the scores related to the virtual area for each group, based on progression of the game and the result of the game process, and determines which of the plurality of groups the virtual area is to be stored in association with, based on the cumulative score, for each of the plurality of periods of time.

4. The information processing system according to claim 1, wherein
    the information processing system determines which of the plurality of groups the virtual area is to be stored in association with, based on the area information at the time that each period of time has passed.

5. The information processing system according to claim 1, wherein
when the game process has been performed a plurality of times for each period of time, the information processing system determines which of the plurality of groups the virtual area is to be stored in association with, based on a plurality of results of the game process performed the plurality of times for each period of time.

6. The information processing system according to claim 1, wherein
the information processing system further performs:
storing user information about at least one of a user of a group who is playing the game related to the virtual area in a current period of time and another user who is playing the game related to the virtual area in the current period of time of a same group, in the memory, and
updating the area information, based on the progression of the game, the result of the game process and the user information.

7. The information processing system according to claim 6, wherein the information processing system stores the user information into the memory in real time.

8. The information processing system according to claim 1, wherein
the information processing system determines which of the plurality of groups the virtual area is to be stored in association with, at or after the time that each period of time has passed, if a condition is not satisfied during the period of time, and
determines which of the plurality of groups the virtual area is to be stored in association with, during each period of time, if the condition is satisfied during the period of time.

9. The information processing system according to claim 8, wherein the condition is related to the area information.

10. The information processing system according to claim 1, wherein
the information processing system sets an amount using a game parameter related to a user or whether or not to use the game parameter, according to an instruction of the user, and
changes a value by which the area information is to be updated, based on a result of the setting.

11. The information processing system according to claim 1, wherein
the terminal displays information about a specific user who is at least one of a user who has played the game related to the virtual area and a user who is playing the game related to the virtual area, of the plurality of users, in relation to the virtual area.

12. The information processing system according to claim 1, wherein
the information processing system updates area information about a first virtual area and area information about a second virtual area related to the first virtual area, corresponding to the groups to which the users operating the terminals belong, based on a result of the game process involved in the game related to the first virtual area.

13. The information processing system according to claim 12, wherein
the second virtual area is adjacent to the first virtual area.

14. The information processing system according to claim 12, wherein
the information processing system further performs:
setting a parameter related to each user, and
updating the area information about the second virtual area, based on the parameter related to the user.

15. The information processing system according to claim 1, wherein a user possesses a character from among a plurality of character types, each character type having gaming parameters, wherein a specific effect for a character is assignable to a first virtual area, the specific effect comprises an advantage in one or more of the gaming parameters for use in the game for characters in all groups or characters in a group associated with the first virtual area, when the specific effect is for characters in the group associated with the first virtual area, the specific effect is assigned a second virtual area, the second virtual area being related to the first virtual area, where in the second virtual area characters in the group associated with the first virtual area in memory have the advantage in one or more of the gaming parameter for use in the game in the second virtual area.

16. The information processing system according to claim 15, wherein
if the first virtual area and a first group are stored in association with each other in the memory, the information processing system executes the game process such that the character possessed by the user belonging to the first group has an advantage in one or more of its gaming parameters for use in the game in the second virtual area, the second virtual area being related to the first virtual area and the information processing system executes the game process without the advantage in the gaming parameters for use in the game in the second virtual area for characters possessed by users belonging to other groups.

17. The information processing system according to claim 16, wherein when a group other than the first group acquires the first virtual area and is stored in associated with each other in memory, and the specific effect is assigned to the second virtual area, the characters possessed by users belonging to another group gain the advantage in the gaming parameters.

18. The information processing system according to claim 15, wherein
the information processing system executes the game process such that the user belonging to the first group has an advantage in the game related to the first virtual area.

19. The information processing system according to claim 1, wherein the at least one virtual area comprising a plurality of virtual areas, for each virtual area, the at least one processor performs:
executing the game process for the respective virtual area;
updating area information about the respective virtual area for each group, based on the progression of the game and a result of the game;
determining, periodically as the game progresses, whether a group maintains hold of the respective virtual area or another group acquires the respective virtual area based on the updated area information for each group;
updating a stored association of a group and the respective virtual area in the memory, based on the periodic determination, the stored association indicating a holder of the respective virtual area, where the game process is executed using the stored association; and
outputting a result of the game in which the plurality of groups compete against each other to acquire the plurality of virtual areas after repeatedly performing the determining and the updating the stored association until an end condition related with the game is satisfied.

20. An information processing system including a plurality of terminals configured to be operated by respective users each belonging to one of a plurality of groups, and for controlling progression of a game comprising a plurality of periods of time in which at least two of the plurality of groups compete against each other to acquire at least one virtual area, the information processing system including at least one processor and a memory, wherein
the information processing system performs:
executing a game process involved in a game related to a virtual area, based on operations of the users performed in at least a subset of the plurality of terminals, respectively;
updating area information about the virtual area for each group, based on the progression of the game and a result of the game process executed based on the operations of the users in the at least a subset of the plurality of terminals, respectively;
determining, as the game progresses, for each of the plurality of periods of time, whether a group maintains hold of the virtual area or another group acquires the virtual area based on the updated area information for each group;
updating a stored association of a group and the virtual area in the memory, based on the determination for each of the plurality of periods of time, the stored association indicating a holder of the virtual area, where the game process is executed using the stored association; and
outputting a result of the game in which the plurality of groups compete against each other to acquire the at least one virtual area after repeatedly performing the determining and the updating the stored association until an end condition related with the game is satisfied, wherein
the information processing system determines which of the plurality of groups the virtual area is to be stored in association with, at or after the time that each period of time has passed, if a condition is not satisfied during the period of time, and
determines which of the plurality of groups the virtual area is to be stored in association with, during each period of time, if the condition is satisfied during the period of time, the information processing system further performs:
limiting, if the condition is satisfied during the period of time, execution of the game process after the condition is satisfied and until the period of time has passed.

21. An information processing system including a plurality of terminals configured to be operated by respective users each belonging to one of a plurality of groups, and for controlling progression of a game comprising a plurality of periods of time in which at least two of the plurality of groups compete against each other to acquire at least one virtual area, the information processing system including at least one processor and a memory, wherein
the information processing system performs:
executing a game process involved in a game related to a virtual area, based on operations of the users performed in at least a subset of the plurality of terminals, respectively;
updating area information about the virtual area for each group, based on the progression of the game and a result of the game process executed based on the operations of the users in the at least a subset of the plurality of terminals, respectively;
determining, as the game progresses, for each of the plurality of periods of time, whether a group maintains hold of the virtual area or another group acquires the virtual area based on the updated area information for each group;
updating a stored association of a group and the virtual area in the memory, based on the determination for each of the plurality of periods of time, the stored association indicating a holder of the virtual area, where the game process is executed using the stored association; and
outputting a result of the game in which the plurality of groups compete against each other to acquire the at least one virtual area after repeatedly performing the determining and the updating the stored association until an end condition related with the game is satisfied,
wherein the information processing system determines which of the plurality of groups the virtual area is to be stored in association with, at or after the time that each period of time has passed, if a condition is not satisfied during the period of time, and
determines which of the plurality of groups the virtual area is to be stored in association with, during each period of time, if the condition is satisfied during the period of time, wherein
the information processing system further performs:
limiting, if the condition is satisfied during the period of time, execution of the game process of the game related to the virtual area for which the determining has been performed, after the condition is satisfied and until the period of time has passed.

22. An information processing system including a plurality of terminals configured to be operated by respective users each belonging to one of a plurality of groups, and for controlling progression of a game comprising a plurality of periods of time in which at least two of the plurality of groups compete against each other to acquire at least one virtual area, the information processing system including at least one processor and a memory, wherein
the information processing system performs:
executing a game process involved in a game related to a virtual area, based on operations of the users performed in at least a subset of the plurality of terminals, respectively;
updating area information about the virtual area for each group, based on the progression of the game and a result of the game process executed based on the operations of the users in the at least a subset of the plurality of terminals, respectively;
determining, as the game progresses, for each of the plurality of periods of time, whether a group maintains hold of the virtual area or another group acquires the virtual area based on the updated area information for each group;
updating a stored association of a group and the virtual area in the memory, based on the determination for each of the plurality of periods of time, the stored association indicating a holder of the virtual area, where the game process is executed using the stored association; and
outputting a result of the game in which the plurality of groups compete against each other to acquire the at least one virtual area after repeatedly performing the determining and the updating the stored association until an end condition related with the game is satisfied, wherein a user possesses a character from among a plurality of character types, each character type having gaming parameters, wherein a specific effect for a character is assignable to a first virtual area, the specific effect comprises an advantage in one or more of the gaming parameters for use in the game for characters in all groups or characters in a group associated with the first virtual area, when the specific effect is for characters in the group associated with the first virtual area, the specific effect is assigned a second virtual area, the second virtual area being related to the first virtual area, where in the second virtual area characters in the group associated with the first virtual area in memory have the advantage in one or more of the gaming parameter for use in the game in the second virtual area, wherein if the first virtual area and a first group are stored in association with each other in the memory, the information processing system executes the game process such that the character possessed by the user belonging to the first group has an advantage in one or more of its gaming parameters for use in the game in the second virtual area, the second virtual area being related to the first virtual area and the information processing system executes the game process without the advantage in the gaming parameters for use in the game in the second virtual area for characters possessed by users belonging to other groups, and wherein the advantage in the one or more gaming parameters caused by the specific effect is different for different types of characters.

23. An information processing method for controlling progression of a game comprising a plurality of periods of time in which at least two of a plurality of groups compete against each other to acquire at least one virtual area, the information processing method comprising:

receiving a result of an execution of a game process involved in a game related to a virtual area, based on operations of the users performed in at least a subset of a plurality of terminals, respectively, each terminal configured to be operated by respective user, each user belonging to one of the plurality of groups, respectively;

updating area information about the virtual area for each group, based on the progression of the game and the result of the execution of the game process based on the operations of the users performed in the at least a subset of the plurality of terminals, respectively;

determining, as the game progresses, for each of the plurality of periods of time, whether a group maintains hold of the virtual area or another group acquires the virtual area based on the updated area information for each group;

updating a stored association of a group and the virtual area in a memory, based on the determination for each of the plurality of periods of time, the stored association indicating a holder of the virtual area, where the game process is executed using the stored association; and outputting a result of the game in which the plurality of groups compete against each other to acquire the at least one virtual area after repeatedly performing the updating the stored association until an end condition related with the game is satisfied, wherein the result of the game in which the plurality of groups compete against each other to acquire the at least one virtual area is output after performing the determining and the updating a predetermined number of times.

24. An information processing apparatus for communicating with a plurality of terminals configured to be operated by respective users each belonging to one of a plurality of groups, and controlling progression of a game comprising a plurality of periods of time in which at least two of the plurality of groups compete against each other to acquire at least one virtual area, the information processing apparatus comprising at least one processor and a memory, the information processing apparatus performs:

obtaining a result of an execution of a game process involved in a game related to a virtual area, based on operations of the users performed in at least a subset of the plurality of terminals, respectively;

updating area information about the virtual area for each group, based on the progression of the game and the result of the game process executed based on the operations of the users performed in the at least a subset of the plurality of terminals, respectively;

determining as the game progresses, for each of the plurality of periods of time, whether a group maintains hold of the virtual area or another group acquires the virtual area based on the updated area information for each group;

updating a stored association of a group and the virtual area in the memory, based on the determination for each of the plurality of periods of time, the stored association indicating a holder of the virtual area, where the game process is executed using the stored association; and outputting a result of the game in which the plurality of groups compete against each other to acquire the at least one virtual area, after repeatedly performing the determining and the updating until an end condition related with the game is satisfied, wherein the information processing apparatus outputs the result of the game in which the plurality of groups compete against each other to acquire the at least one virtual area after performing the determining and the updating a predetermined number of times.

25. A non-transitory storage medium having stored therein an information processing program executable by a processor of an information processing apparatus for communicating with a plurality of terminals configured to be operated by respective users each belonging to one of a plurality of groups, and controlling progression of a game comprising a plurality of periods of time in which at least two of the plurality of groups compete against each other to acquire at least one virtual area, the information processing program, when execute by the processor, causes the processor to perform:

obtaining a result of an execution of a game process involved in a game related to a virtual area, based on operations of the users performed in at least a subset of the plurality of terminals, respectively;

updating area information about the virtual area for each group, based on the progression of the game and the result of the execution of the game process based on the operations of the users performed in the at least a subset of the plurality of terminals, respectively;

determining, as the game progresses, for each of the plurality of periods of time, whether a group maintains hold of the virtual area or another group acquires the virtual area based on the updated area information for each group;

updating a stored association of a group and the virtual area in a memory, based on the determination for each of the plurality of periods of time, the stored association indicating a holder of the virtual area, where the game process is executed using the stored association; and outputting a result of the game in which the plurality of groups compete against each other to acquire the at least one virtual area, after repeatedly performing the determining and the updating until an end condition for the game is satisfied, wherein the result of the game in which the plurality of groups compete against each other to acquire the at least one virtual area is output after performing the determining and the updating a predetermined number of times.

* * * * *